United States Patent [19]

Shinkawa et al.

[11] Patent Number: 5,138,451
[45] Date of Patent: Aug. 11, 1992

[54] TELEVISION RECEIVER

[75] Inventors: Keiro Shinkawa, Hiratsuka; Tsutomu Noda; Toshinori Murata, both of Yokohama; Nobutaka Hotta, Kamakura; Kazuhiro Ooyagi, Yokohama, all of Japan

[73] Assignees: Hitachi Ltd., Hitachi Video Engineering, Inc., Tokyo; Hitachi Automotive Engineering Co., Ibaraki, all of Japan

[21] Appl. No.: 393,696

[22] Filed: Aug. 10, 1989

[30] Foreign Application Priority Data

Oct. 12, 1988 [JP] Japan .............................. 63-254966
Feb. 10, 1989 [JP] Japan .................................. 1-29836

[51] Int. Cl.$^5$ .............................................. H04N 5/04
[52] U.S. Cl. ..................................... 358/148; 358/158
[58] Field of Search ................. 358/188, 148, 158, 153

[56] References Cited

U.S. PATENT DOCUMENTS 4,159,481 6/1979 Mikado ............................... 358/153

FOREIGN PATENT DOCUMENTS 0010780 3/1981 Japan .

Primary Examiner—James J. Groody
Assistant Examiner—David E. Harvey
Attorney, Agent, or Firm—Antonelli, Terry, Stout & Kraus

[57] ABSTRACT

A sync generator which generates a reference horizontal synchronizing signal, a time difference detector which detects the time difference between the reference horizontal synchronizing signal and a horizontal synchronizing signal within a received television signal, and a variable delay circuit which responds to an output signal of the time difference detector to control the delay time and delay the received television signal are installed in a television receiver. When a plurality of horizontal synchronizing signals exist in one horizontal scanning period of the received television signal, the time difference between the horizontal synchronizing signal with the maximum amplitude and the reference horizontal synchronizing signal is detected, and the delay time of the received television signal is controlled in the variable delay circuit according to this time difference. As a result, the phase of the horizontal synchronizing signal with the maximum amplitude matches the phase of the reference horizontal synchronizing signal. Therefore, when changes in the receiving environment cause the signal strength of ghosts to become greater than that of an original signal and it becomes desirable to receive the ghost as a main signal in place of the original signal, it is possible to switch from reception of the original signal to reception of the ghost signal without resulting in distortion of synchronization.

8 Claims, 33 Drawing Sheets

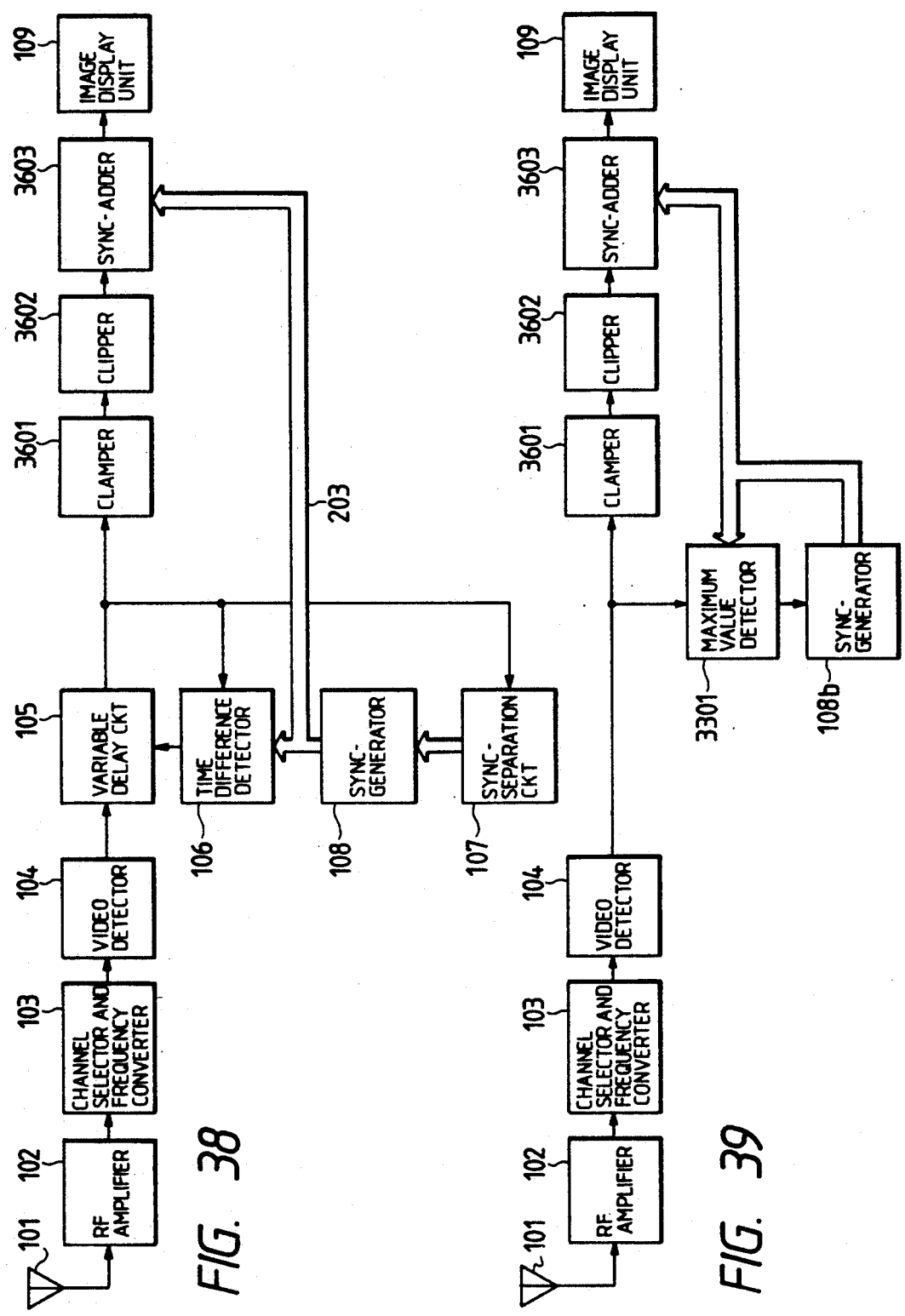

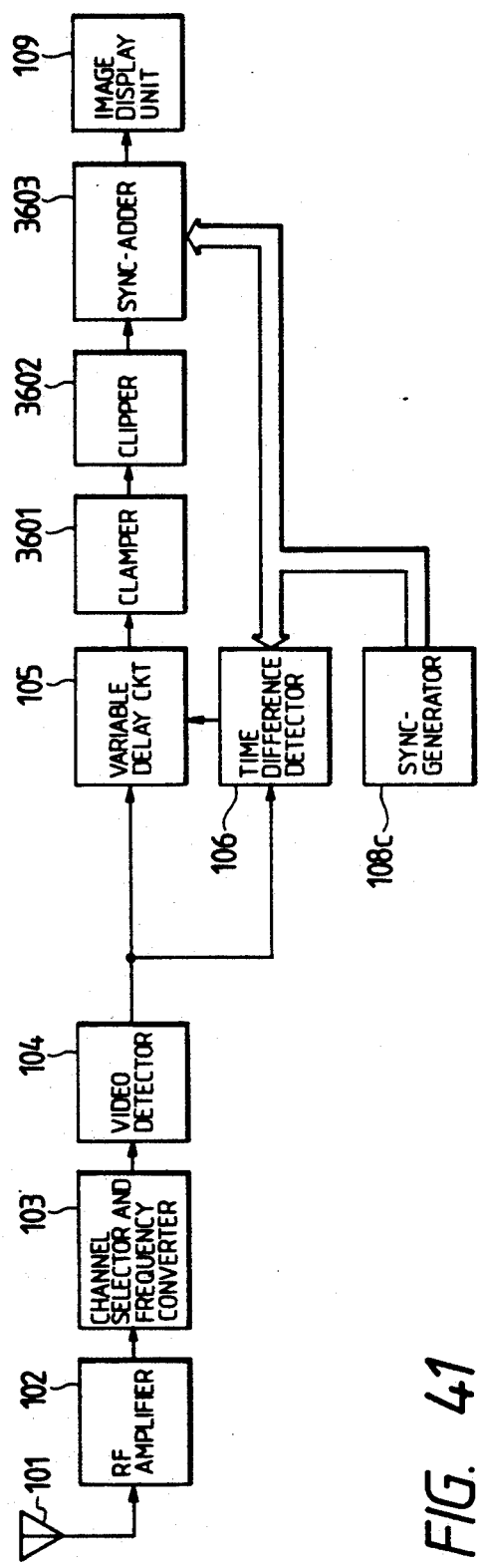
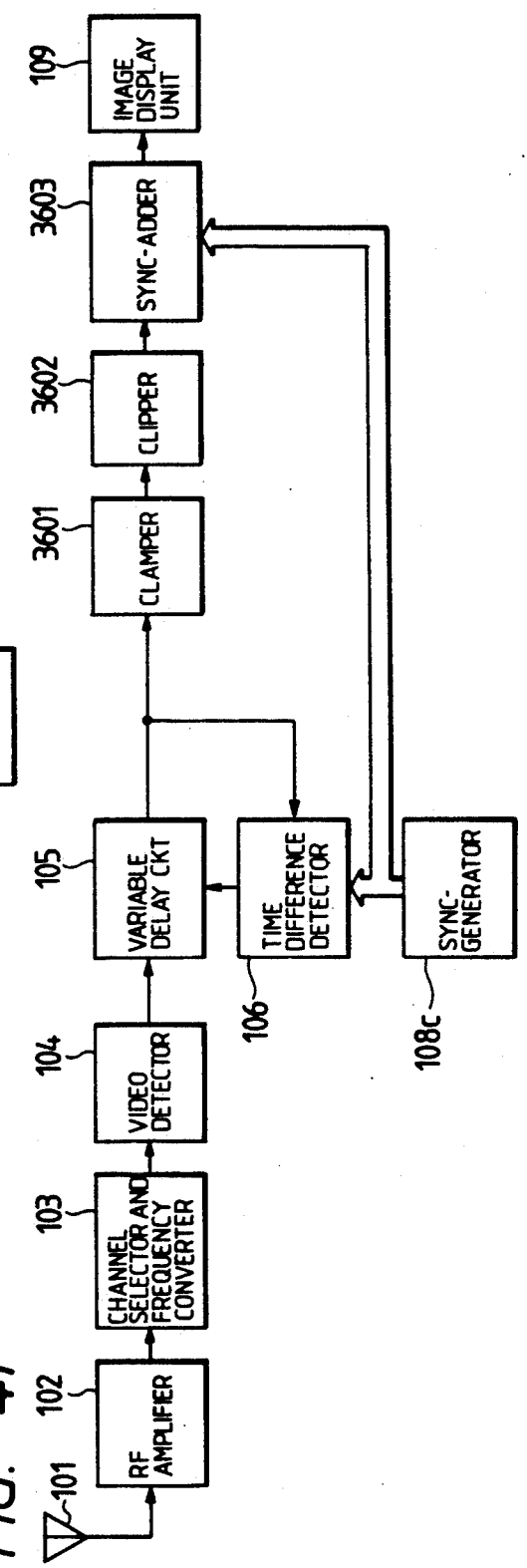

TELEVISION RECEIVER

BACKGROUND OF THE INVENTION

The present invention relates to a television receiver, especially to a television receiver which is mounted in a mobile unit and can provide high quality video images. A typical example of television receivers mounted in traveling bodies or mobile units (e.g., those mounted in automobiles) is described in Japanese Patent Application Laid-open No. 56-10780. This example maintains an optimum receiving state when an automobile moves to different reception environments with the following components and in the following manner: Four diversity antennas are mounted on the automobile, and there is a switching circuit which connects an output from one of these four antennas to an antenna input circuit of a television receiver mounted on the automobile. The detection output levels of the antennas are compared by time division switching of the switching circuit with a sampling switching control signal generated during a vertical blanking period of a television video signal. The antenna with the highest level is connected to the antenna input circuit of the television receiver. A control circuit maintains this state until the next vertical blanking period.

This conventional technology can supply a high quality video image when in a relatively good receiving environment, because reception is achieved by continuously switching the antennas so that the input waves with the strongest electric field intensity is selected. When the mobile unit is located in an area with many buildings, such as in the central part of cities, and ghosts are frequently generated, this method is not able to fully realize its potential because of the following reasons.

When ghosts exist, the conditions of ghosts generally changes when the automobile moves. Therefore, when the ghost signal is especially strong, the DU ratio (desired signal to undesired signal ratio) is inverted so that the ghost signal becomes the original main signal, and the main signal is considered the ghost signal. In other words, a time difference will occur in the main signal before and after the DU ratio is inverted. A sync-generator of the receiver will follow the currently input signal to synchronize with it, but it will momentarily be unable to follow the signal, then operate according to a delay time constant. During this period, a time difference will occur between the synchronizing signal in the video signal and that generated by sync-generator, so that video image will be distorted. Furthermore, if the DU ratio is frequently inverted, this video distortion will also become more frequent, so that the quality of reception will deteriorate significantly.

When opposite phase ghosts are being generated and the level of opposite phase ghosts rises, the white peak location of the video signal of the opposite phase ghost will become lower than the pedestal level of the main signal, so that sync-separation output will occur. In other words, because a synchronizing signal other than the original horizontal synchronizing signal is generated, the synchronization is easily distorted. If the level of the opposite phase ghost becomes even higher, the level of the white peak location of the opposite phase ghost will become lower than the level of the horizontal synchronizing signal, so that synchronization in the sync-generator will be completely disrupted.

When fading causes drastic fluctuations in the amplitude of the synchronizing signal, it becomes difficult to separate the synchronizing signal from the video signal, so that synchronization becomes distorted.

SUMMARY OF THE INVENTION

An object of the present invention is to correct the weakness of aforementioned conventional technology, and to provide a television receiver which can display high quality video images when it is mounted in a traveling body or a mobile unit even though ghosts exist.

In order to accomplish the above object, according to the present invention, a television receiver is provided with a sync-generator which generates a synchronizing signal, a time difference detector which detects the time difference between an output of the sync-generator and a synchronizing signal in a received signal, and a variable delay circuit which controls the delay of the received signal based on the output of the time difference detector.

According to the present invention, the received signal is converted to a video intermediate frequency signal through an RF amplifier, channel selector and frequency converter. A television signal is obtained by detecting this video intermediate frequency signal with a video detector. The variable delay circuit allows variable delay of the television signal detected by the video detector, then outputs it to the next stage. The sync-generator generates a reference synchronizing signal. When a plurality of received synchronizing signals are included in one horizontal scanning period, the time difference detector detects the time difference between the synchronizing signal with the largest amplitude and the reference synchronizing signal. The variable delay circuit controls the delay according to this time difference. As a result, when a ghost with an amplitude level which is larger than the main signal is received, the original main signal is replaced with the ghost and the ghost is treated as a new main signal so that the phenomenon in which the main signal moves on the television screen is alleviated.

According to the present invention, the synchronization is smoothly switched without movement in the image or confusing synchronization, so that a high quality image is maintained. This is true even in conditions in which the television receiver is mounted on a mobile unit which is moving, and in a reception environment in which ghost signals become stronger than the main signal and replace the main signal.

BRIEF DESCRIPTION OF THE DRAWINGS

In the accompanying drawings:

FIGS. 38, 39, 40 and 41 are block diagrams of television receivers according to still other embodiments of the present invention;

DETAILED DESCRIPTION OF PREFERRED EMBODIMENTS

Figure 1:
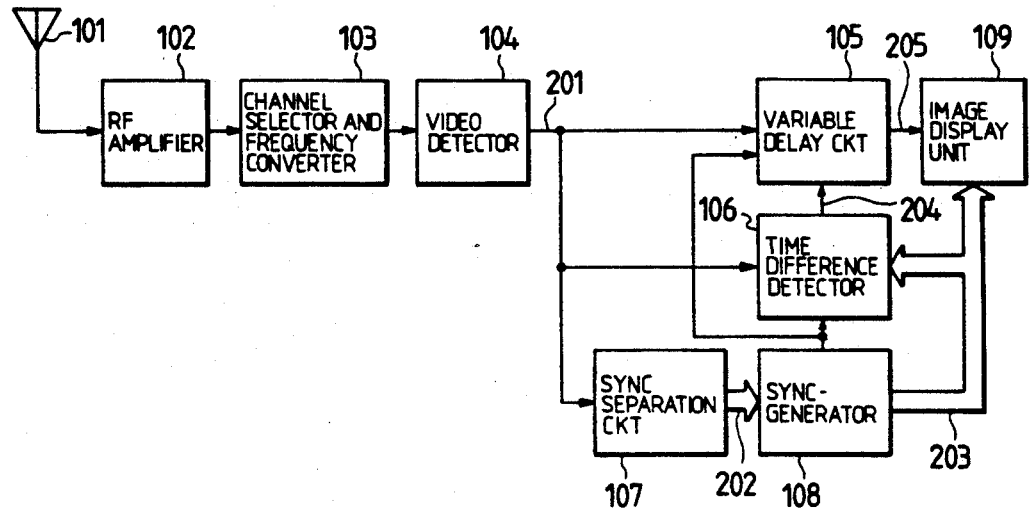
FIG. 1 is a block diagram of a television receiver according to an embodiment of the present invention.

Embodiments of the present invention are described below referring to the drawings.

A reference numeral 101 denotes an antenna, 102 denotes an RF amplifier, 104 denotes a video detector, 105 denotes a variable delay circuit, 106 denotes a time difference detector, 107 denotes a sync-separation circuit, 108 denotes a sync-generator, and 109 denotes an image display unit.

Figure 2:
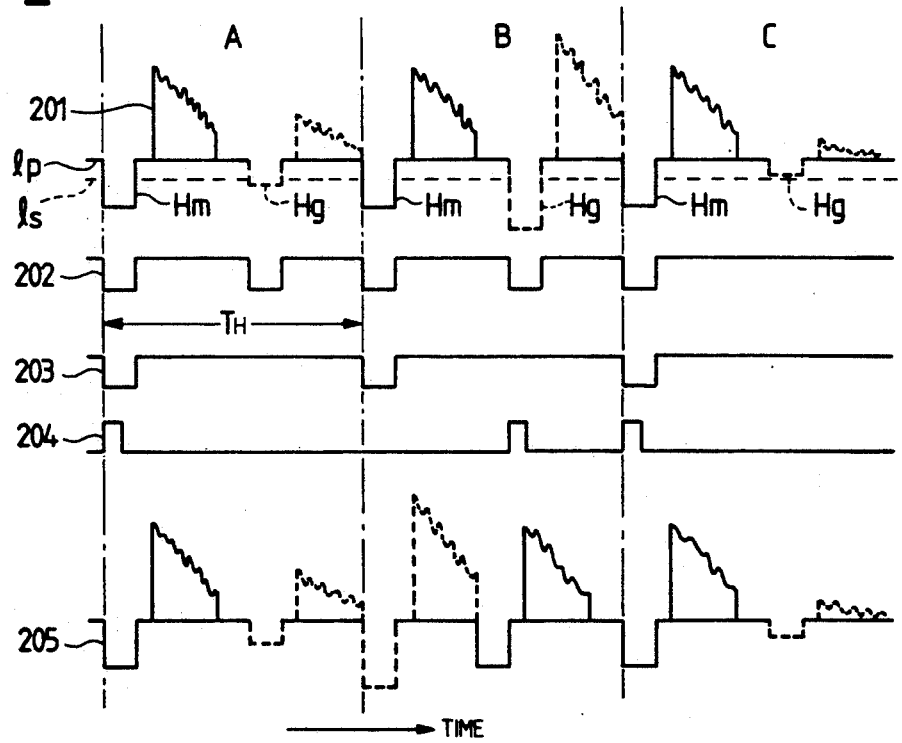
FIG. 2 is a timing chart for signal waveforms of various sections of the television receiver shown in FIG. 1.

FIG. 2 is a timing chart of signals from various sections of the circuits shown in FIG. 1.

A reference numeral 201 desigantes an output signal of the video detector 104, 202 designates an output signal of sync-separation circuit 107, 203 designates an output signal of sync-generator 108, 204 designates an output signal of time difference detector 106, and 205 designates an output signal of variable delay circuit 104.

The operation of the circuits will be described by referring to FIGS. 1 and 2.

The television signal input from the antenna 101 is sent through the RF amplifier 102, channel selector and frequency converter 103, and video detector 104 to attain video signal 201. The solid lines in signal 201 indicate the original signal (main signal), and the broken lines indicate ghost signals. The sync-separation circuit 107 slices the signal 201 at level ls which is lower than the pedestal level lp to attain the signal 202. The sync-generator 108 extracts only the signal which correlates to one cycle TH of the horizontal synchronizing signal from the signal 202, then generates a horizontal synchronizing signal based on this to attain the signal 203. The time difference detector 106 detects the synchronizing signal with the largest amplitude in the signal 201 for each cycle TH of signal 203 to attain the signal 204. The variable delay circuit 105 delays the input signal 201 according to the signal 204 to attain the signal 205. At the image display unit 109, the signal 205 is input as the video signal, and the signal 203 is input as the horizontal synchronizing signal.

Conventionally, the output signal 201 of video detector 104 is input to the image display unit 109 without any changes as the video signal. In this method, the synchronizing signal in the input video signal 201 is detected by the sync-separation circuit in the image display unit 109. Because of this, the horizontal synchronizing signal becomes similar to the signal 202, so that a plurality of synchronizing signals exist during one cycle TH of the synchronizing signal and synchronization is easily disrupted. In this embodiment, however, only signals which correlate to one cycle TH of the horizontal synchronizing signal are retrieved from the signal 202 which is generated by sync-separation circuit 107. The horizontal synchronizing signal is generated based on the retrieved signal, and this horizontal synchronizing signal is input into the image display unit 109 independently, so that synchronization is not disrupted.

Furthermore, even if the output signal of the sync-separation circuit in the image display unit 109 is stable in conventional methods as represented by signal 203, the level ratio or DU ratio of the main video signal and the ghost video signal is inverted in A and B ranges, so that the image on the image display unit will move making it very difficult to be viewed. In this embodiment, however, the time difference detector 106 detects the synchronizing signal with the largest amplitude during one cycle TH of the synchronizing signal (e.g., in ranges A and C, the horizontal synchronizing signal Hm of the main signal, and in range B the horizontal synchronizing signal Hg of the ghost signal.). The time difference between this signal and the output signal 203 of the sync-generator 108 is used to control a delay time of variable delay circuit 105. Because the timing of the minimum level synchronizing signal (i.e., the synchronizing signal with the maximum amplitude) in the video signal 205 and the timing of the synchronizing signal 203 always match, image movement on the image display unit is reduced.

Figure 3:
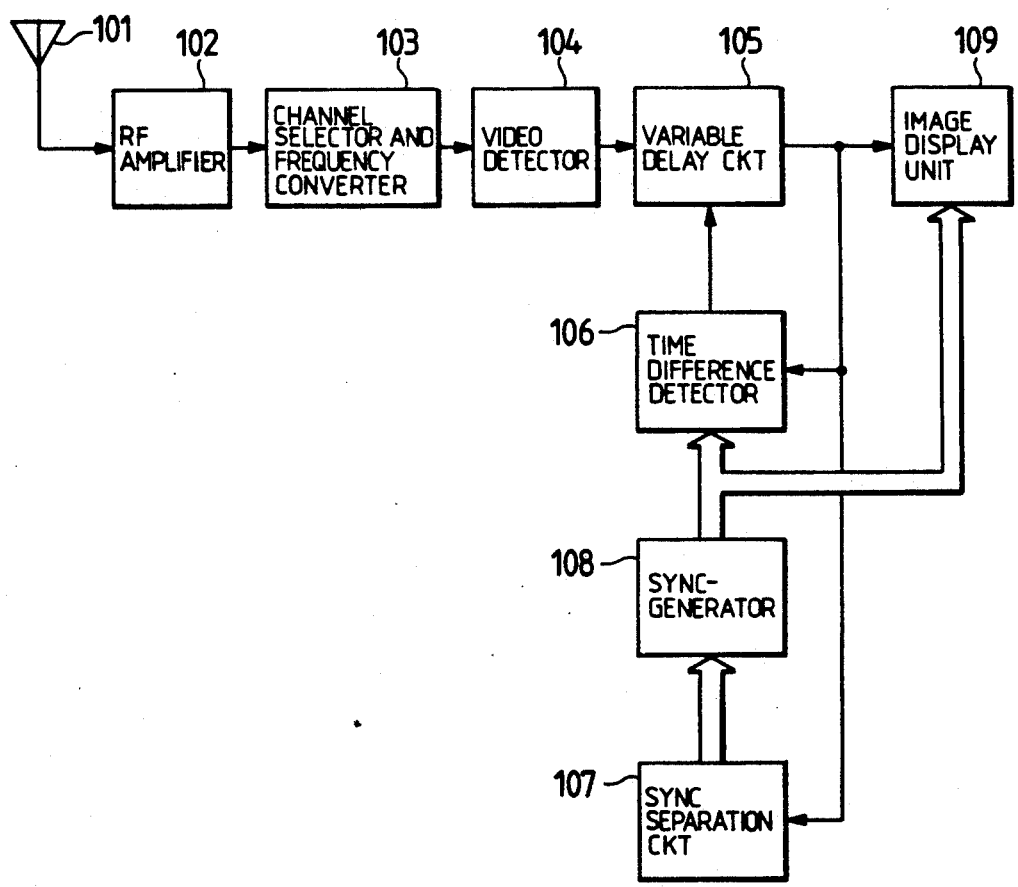
FIG. 3 is a block diagram of a television receiver according to another embodiment of the present invention.

FIG. 3 shows another embodiment of the present invention. The various circuits are the same as those shown in FIG. 1. FIG. 1 uses a feed-forward type delay correction. FIG. 3 shows a feedback type delay correction in which time difference detector 106 is used to detect the time difference between the output signal of sync-generator 108 and the video signal after the video signal is delayed with variable delay circuit 105.

The embodiment in FIG. 3 has the a similar effect as the embodiment in FIG. 1 so that disruption of synchronization and image movement is reduced.

Figure 4:
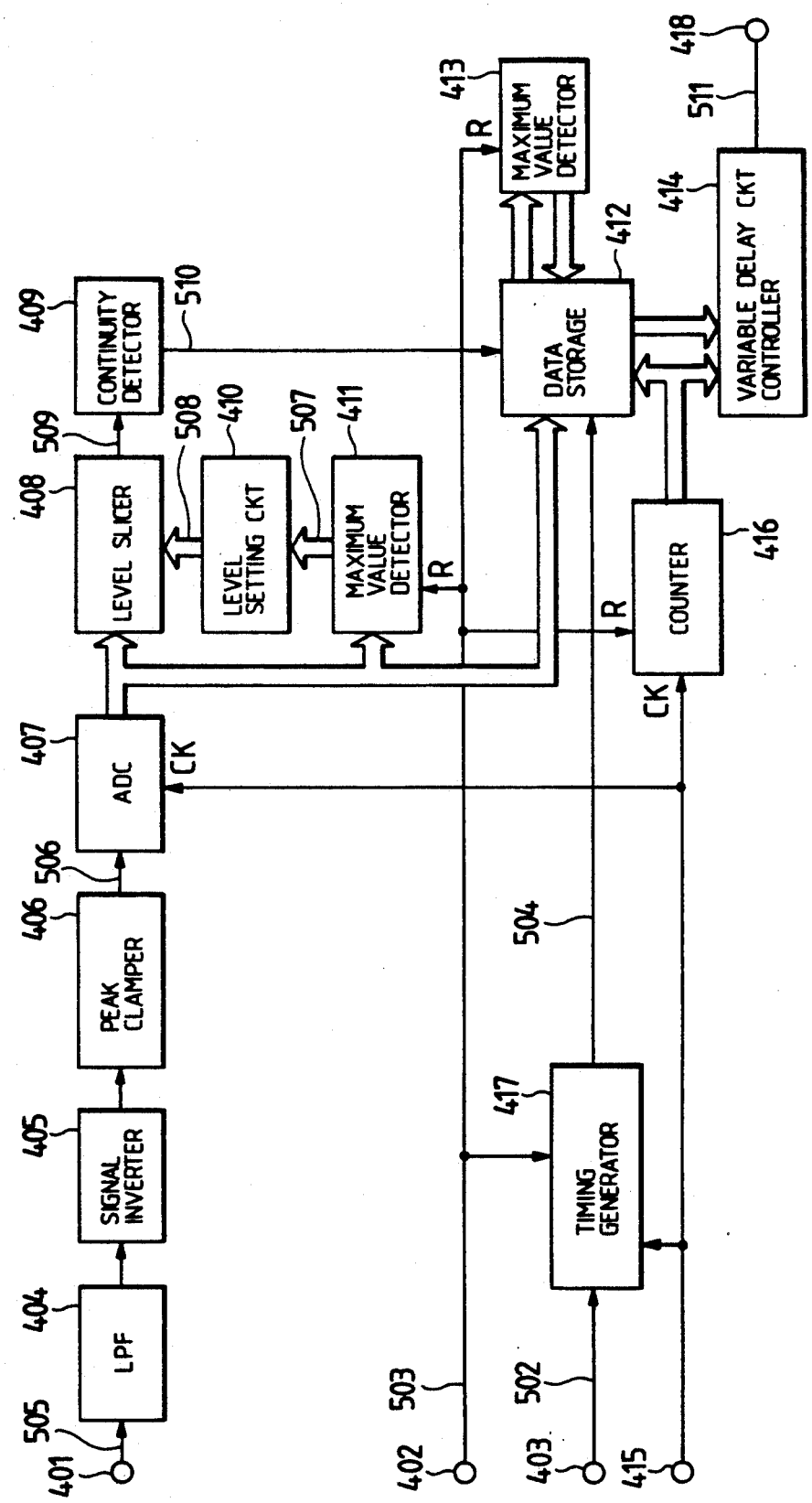
FIG. 4 is a block diagram showing an example of a time difference detector in the television receiver shown in FIG. 1.

FIG. 4 is a block diagram which shows an actual example of the time difference detector 106 in FIG. 1. In this diagram, a reference numeral 401 designates an input terminal for the output signal of video detector 104 in FIG. 1, 402 designates a input terminal for the horizontal synchronizing signal of sync-generator 108 in FIG. 1, 403 designates a input terminal for the vertical synchronizing signal of sync-generator 108 in FIG. 1, 404 designates a low pass filter (LPF) 405 designates a signal inverter, 406 designates a peak clamper, 407 designates an analog/digital converter (ADC) 408 designates a level slicer, 409 designates a continuity detector, 410 designates a level setting circuit, 411 designates a maximum value detector, 412 designates a data storage, 413 designates a maximum value detector, 414 designates a variable delay circuit controller, 415 designates a reference clock signal input terminal, 416 designates a counter, 417 designates a timing generator, and 418 designates an output signal terminal of the variable delay circuit controller 414.

Figure 5:
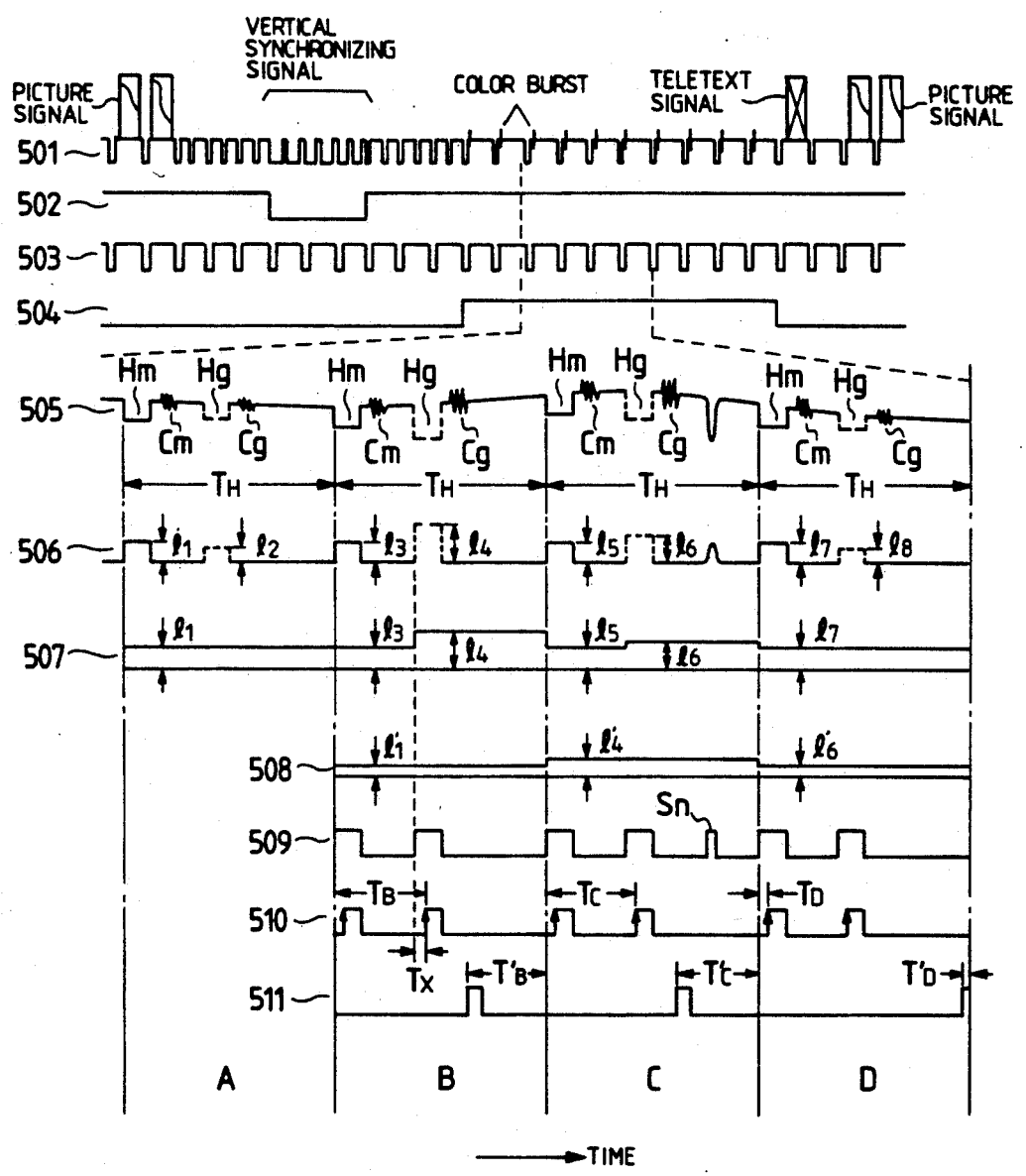
FIG. 5 is a timing chart for signal waveforms of various sections of the time difference detector shown in FIG. 4.

FIG. 5 is a timing chart for various signals in the circuits in FIG. 4. In FIG. 5, a reference numeral 501 designates an output signal of the video detector 104 in FIG. 1 (the input video signal of input terminal 401), 502 an output vertical synchronizing signal of sync-generator 108 in FIG. 1 (an input vertical synchronizing signal of input terminal 403), 503 an output horizontal synchronizing signal of sync-generator 108 in FIG. 1 (input horizontal synchronizing signal of input terminal 402), 504 an output signal of the timing generator 417, 505 an expanded time axis figure of input video signal 501, 506 an output signal of peak clamper 406, 507 an output signal of the maximum value detector 411, 508 an output signal of the level setting circuit 410, 509 an output signal of the level slicer 408, 510 an output signal of the continuity detector 409, and 511 an output signal of the variable delay circuit controller 414.

The operation of the circuits will be described while referring to FIG. 4 and 5.

The output signal 505 from the video detector 103 in FIG. 1 is input from input terminal 401 is sent to the LPF 404 where the high frequency components in the video signal (e.g., color burst signals Cm and Cg, pulse noise, etc.) which are not necessary for timing detection of horizontal synchronizing signals Hm and Hg are cut. The output signal from LPF 404 is inverted at the signal inverter 405, then the output signal from signal inverter 405 is aligned to a constant pedestal level at the peak clamper 406 to attain the signal 506. The signal 506 is converted from analog to digital at the ADC 407. The maximum value for each horizontal scanning cycle TH of the digitized signal 506 is detected at the maximum value detector 411 to attain the signal 507. The maximum value in range A is $l_1$, in range B $l_4$, and in range C $l_6$. At the level setting circuit 410, about half of the maximum value of signal 507 is calculated for each TH (e.g., $l'_1$ is calculated from $l_1$, $l'_4$ is calculated from $l_4$, and $l'_6$ is calculated from $l_6$) to attain the slice level signal 508 of the next horizontal scanning cycle TH. The digitized signal 506 is sliced by the level slicer 408 at the level of signal 508 to attain the signal 509, then the continuity of the high level of signal 509 is detected by the continuity detector 409. Then, small pulse Sn of the time width caused by pulse noise is removed to attain the signal 510. The video signal data of digitized signal 506 and the address data of the counter 416 are stored in the data storage 412 according to the leading edge timing of signal 510. The counter 416 is a counter which divides the master clock or reference clock input from input terminal 415 (e.g., its frequency is 910 times the frequency of the horizontal synchronizing signal at 4 fsc; where fsc is the frequency of the color subcarrier). This counter is reset by the output horizontal synchronizing signal 503 of the sync-generator 108 in FIG. 1 which is input from input terminal 402 for each horizontal scanning cycle TH.

Storing the video signal data of digitized signal 506 in the data storage 412 at the leading edge timing of signal 510 means that only the horizontal synchronizing signal data from among all video signal data will be stored.

The timing generator 417 outputs the signal 504 which is high during a period during which only horizontal synchronizing signals and color burst signals exist and picture signals and teletext signals are not multiplexed after the equalizing pulse period in vertical blanking periods. These conditions are created by the output horizontal synchronizing signal 503 of the sync-generator 108 in FIG. 1 which is input from the input terminal 402, the output vertical synchronizing signal 502 of the sync-generator 108 in FIG. 1 which is input from the input terminal 403, and the output reference clock of the sync-generator 108 in FIG. 1 which is input from the input terminal 415. During all other times the output signal 504 of timing generator 417 is low. The signal 504 is applied to the data storage 412.

When the control signal 504 is high, the data storage stores video data delivered out of the ADC 407 and address data output from the counter 416 according to the leading edge timing of the output signal of continuity detector 409. When the control signal 504 is low, however, inputting of data from external sources is halted, and the video data and address data which stored during the high level interval of the signal 504 are held.

The maximum value detector 413 detects the video signal data with the maximum level for each horizontal scanning cycle TH from the video signal data stored in data storage 412. The difference between maximum value detector 411 and 413 is that maximum value detector 411 detects the data with the maximum level from all the data in signal 506 per horizontal scanning cycle, whereas maximum value detector 413 detects the data with the maximum level from the horizontal synchronizing signal data. The address data TB, TC and TD of the maximum level video signal data detected by maximum value detector 413 is input to the variable delay circuit controller 414. When the output control signal 504 of the timing generator 417 is high, timing calculations and correction of delay Tx for the continuity detector 409 are executed from the maximum level video signal address data TB, TC and TD. Then, the control signal 511 of the variable delay circuit 105 in FIG. 1 is output from output terminal 418.

Figure 6:
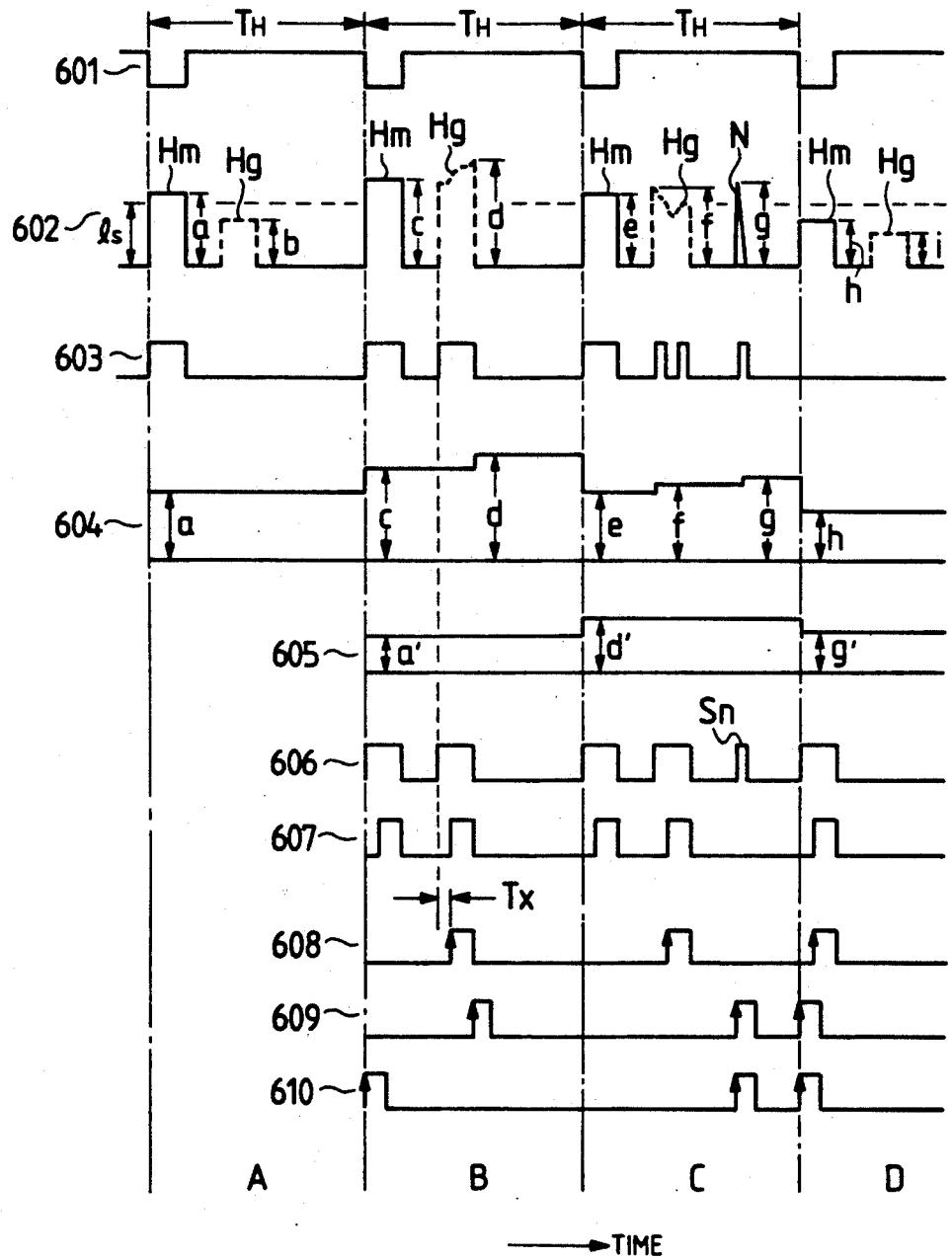
FIG. 6 is a timing chart of the signal waveforms necessary to explain operations of a level slice circuit, continuity detector, level setting circuit and maximum value detector in the time difference detector shown in FIG. 4.

Next, the details concerning the level slicer 408, continuity detector 409, level setting circuit 410 and the maximum value detector 411 in FIG. 4 shall be described. FIG. 6 is a descriptive diagram of these circuits. In FIG. 6, 601 the output horizontal synchronizing signal of sync-generator 108 in FIG. 1; 602 is the output signal of the peak clamper 406 in FIG. 4; 603 is the signal which is created by slicing signal 602 at a given fixed level; 604 is the output signal of the maximum value detector 411 in FIG. 4; 605 is the output signal of the level setting circuit 410 in FIG. 4; 606 is the output signal of level slicer 408 in FIG. 4; 607 is the output signal of continuity detector 409 in FIG. 4; 608 is the output signal of maximum value detector 413 in FIG. 4; 609 is the timing signal of the maximum value of signal 601 for each horizontal scanning period; and 610 is the timing signal of the maximum value of the leading edge of signal 601 fo each horizontal scanning period.

The LPF 404 in FIG. 4 cuts the high frequency components in the signal such as color signals which make the detection of horizontal synchronizing signals difficult, the signal inverter 405 inverts the signal, then the signal 602 for which the pedestal level has been made constant by the peak clamper is digitized by ADC 407.

When digitized signal 602 is sliced at fixed level ls, signal 603 is attained. The slice level for signal 603 is fixed, so that the output signal cannot be attained in one horizontal scanning period as in range D. The level of horizontal synchronizing signals fluctuates to a great degree because of interference between the original signal and the ghost signal, so that fixing the slice level makes it impossible to follow these fluctuations. Therefore, the maximum level of the digitized signal 602 is detected for each horizontal scanning period TH by the maximum value detector 411 to attain signal 604. The slice level is calculated by the level setting circuit 410 from signal 604 to attain signal 605. If the digitized signal 602 is sliced by the level slicer 408 with signal 605, signal 606 is attained. By using this method, the maximum level of input signal 602 is always detected for each horizontal scanning period TH. Because the slice level is set to correspond to the maximum level of input signal 602, it allows coping with level fluctuations in the horizontal synchronizing signal. This has the effect of reducing undetected synchronizing signals caused by low synchronizing signal levels, reducing mis-detection of noise elements, etc.

The level slicer 408 slices the input signal 602 with the level of signal 605 to attain signal 606. The continuity of signal 606 is detected by continuity detector 409, then signal element Sn which are caused by pulse noise are removed to attain signal 607. The level data of signal 607 which was digitized according to the leading edge timing of signal 607 and the address data of counter 416 in FIG. 4 are stored in data storage 412. The maximum level data for each horizontal scanning cycle TH is detected by the maximum value detector 413 from data storage 412, then the address data for the maximum level data is output from data storage 412. Signal 608 shows the address data as a timing diagram.

When signal 609 which has simply detected the maximum value of signal 602 for each horizontal scanning cycle TH and signal 608 which has been attained from the application example in FIG. 4 are compared, signal 609 detects the leading edge timing of ghost horizontal synchronizing signal Hg in range B, and the timing of noise signal N in area C. In other words, the timing of signal 609 is affected by noise in the horizontal synchronizing signal and high level pulse noise, so that it is difficult to detect the horizontal synchronizing signal with the maximum amplitude for each horizontal scanning period TH.

Signal 610, which detects the timing of the maximum level of the leading edge of signal 602, also detects the timing of noise signal N in range C, so that its timing is affected by high level pulse noise. Although pulse noise can be cut by reducing the cutoff frequency of LPF 404 in FIG. 4, this will make it difficult to detect the horizontal synchronizing signal with the maximum amplitude for each horizontal scanning period because the leading edge of each horizontal scanning period will also be decreased.

In contrast to signals 609 and 610, signal 608 slices signal 602 at a level of change which corresponds to signal 602. The continuity of the sliced signal is detected before it is recognized as a horizontal synchronizing signal. The level and timing are stored. From among the multiple horizontal synchronizing signal data which are stored for each horizontal scanning period TH, the data with the maximum level is detected and its timing is output. Therefore, there is little chance that pulse noise will be detected, and the only difference in detection timing is the continuity detection delay Tx from the leading edge of the horizontal synchronizing signal. Because this continuity detection delay Tx is always constant, correction is simple.

Therefore, if the embodiment example in FIG. 4 is used, misdetection of the horizontal synchronizing signal with the maximum amplitude for each horizontal scanning period caused by noise in the horizontal synchronizing signals and pulse noise can be reduced.

The control of data storage 412 by timing generator 417 in FIG. 4 will be described below.

As has already been described in FIG. 5, the output signal 504 of the timing generator 417 is high only after vertical synchronizing signals and equalizing pulse periods within the vertical blanking period, and during horizontal synchronizing signals and color bursts which are not multiplexed with picture signals and teletext signals. In other words, the variable delay circuit 105 is controlled each cycle of the vertical synchronizing signal. This vertical synchronizing will be described by using FIGS. 7, 8, 9 and 10.

Figure 7:
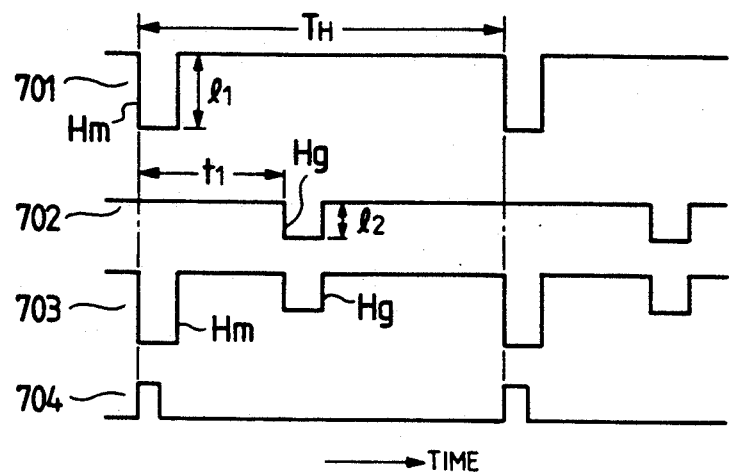
FIGS. 7, 8, 9 and 10 are timing charts of signal waveforms necessary to explain operations of a timing generator and variable delay circuit controller in the time difference detector shown in FIG. 4.

FIG. 7 is an operation description diagram of FIG. 4. The period shown in this diagram is the period after vertical synchronizing signals and equalizing pulse periods within the vertical blanking period, and during horizontal synchronizing signals and color bursts which are not multiplexed with picture signals and teletext signals. In this diagram, 701 is the original video signal (main signal), 702 is the video signal created by the in-phase ghost, 703 is a composite signal which adds signal 702 to signal 701, 704 is the signal which detects the minimum level timing of signal 703.

Figure 8:
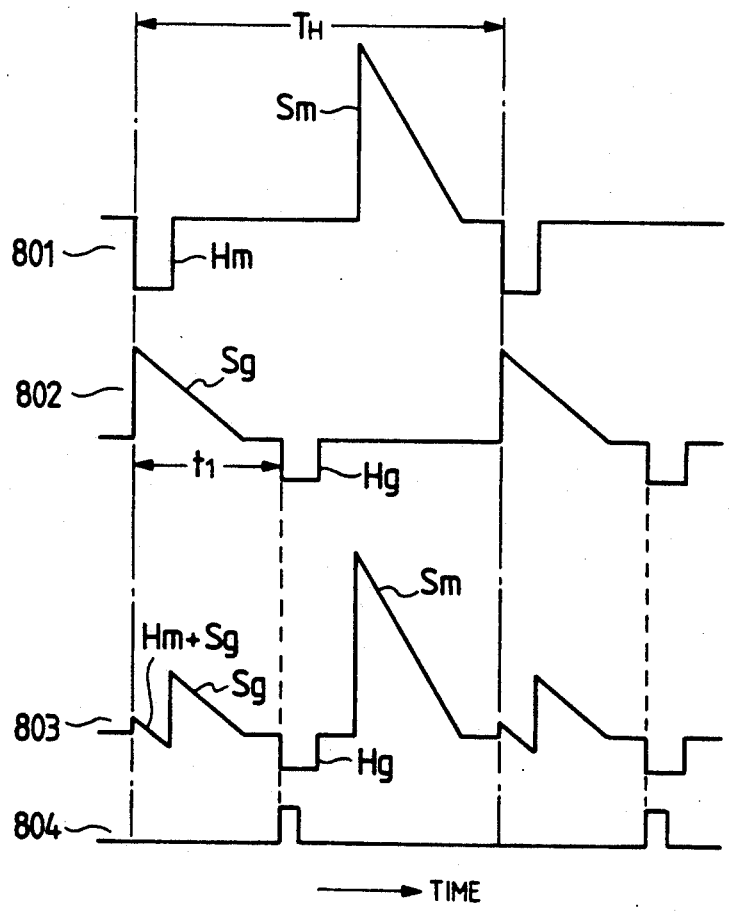

FIG. 8 is also an operation description diagram of FIG. 4. The period shown by this diagram is the period in which the picture signal is multiplexed. In this diagram, 801 is the original video signal (main signal), 802 is the video signal created by the in-phase ghost, 803 is the composite signal which adds signal 802 to signal 801, and 804 is the signal which detects the minimum level timing of signal 803.

Figure 9:
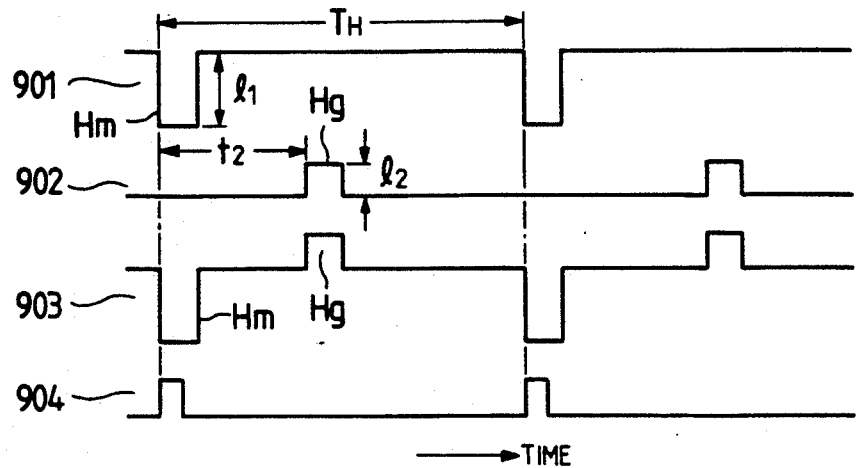

FIG. 9 is another operation description diagram of FIG. 4. The period shown by this diagram is the period after vertical synchronizing signals and equalizing pulse periods within the vertical blanking period, and during horizontal synchronizing signals and color bursts which are not multiplexed with picture signals and teletext signals. In this diagram, 901 is the original video signal (main signal), 902 is the video signal created by the negative-phase ghost, 903 is the composite signal which adds signal 902 to signal 901, and 904 is the signal which detects the minimum level timing of signal 903.

Figure 10:
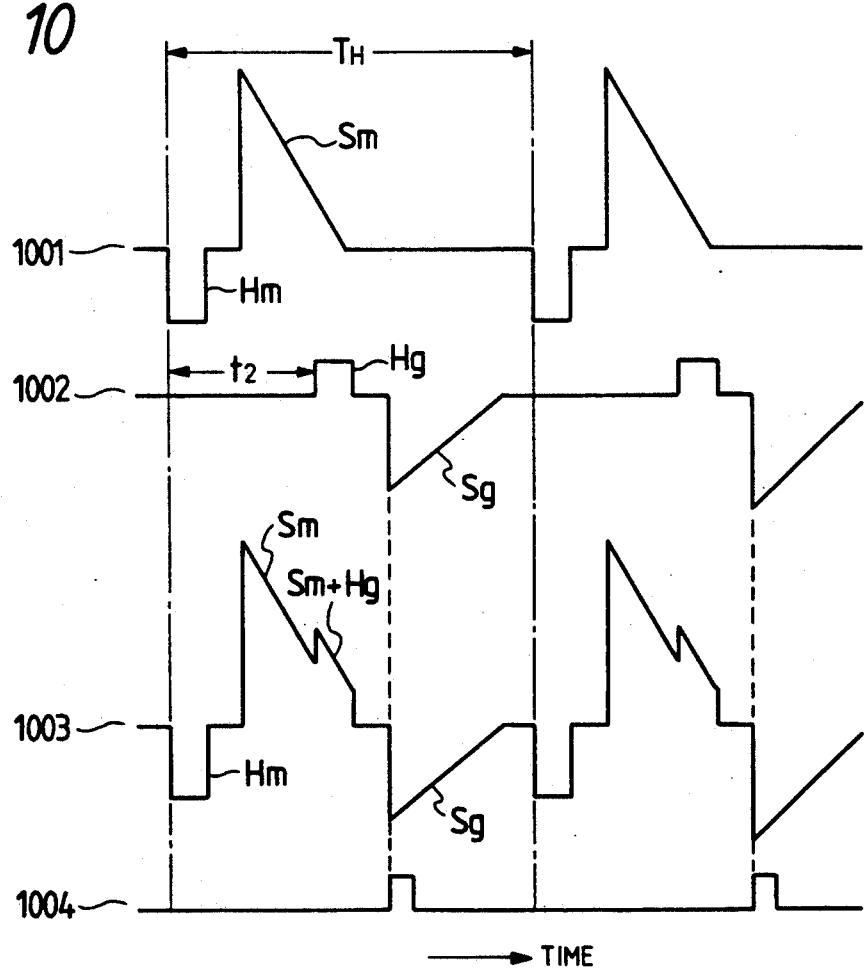

FIG. 10 is yet another operation description diagram of FIG. 4. The period shown by this diagram is the period in which the picture signal is multiplexed. In this diagram, 1001 is the original video signal (main signal), 1002 is the video signal created by the negative-phase ghost, 1003 is the composite signal which adds signal 1002 to signal 1001, and 1004 is the signal which detects the minimum level timing of signal 1003. Because FIGS. 7, 8, 9 and 10 are simplified diagrams, the color burst signals have been abbreviated. Furthermore, TH indicates the horizontal scanning period, Hm the horizontal synchronizing signal of the main signal, Hg the horizontal synchronizing signal of the ghost signal, $l_1$ is the amplitude of Hm, $l_2$ is the amplitude of Hg, and Sm is the picture of the main signal. In FIG. 7 and 8 t1 is the delay time of the in-phase ghost. In FIG. 9 and 10, t2 is the delay time of the negative-phase ghost. In FIG. 8 and 10, Sm is the picture signal of the main signal, and Sg is the picture signal of the ghost.

The detection operation, when there is an in-phase ghost, of horizontal synchronizing signals with the maximum amplitude in FIG. 4 is described below using FIGS. 7 and 8.

In the period after the equalizing pulse in the vertical blanking period in which there are only horizontal synchronizing signals which are not multiplexed with picture signals, and teletext signals, if the minimum level timing of horizontal scanning period TH of composite signal 703 (which is a composite of the main signal 701 and delay time t1, and level ratio $l_2/l_1 = \frac{1}{2}$ of the in-phase ghost 702) is detected, then signal 704 will be attained. Signal 704 is detecting the timing of the horizontal synchronizing signal Hm of the main signal which has a larger amplitude than the horizontal synchronizing signal Hg of the in-phase ghost signal.

In contrast, in the periods other than the vertical blanking period in which picture signals are multiplexed shown in FIG. 8, if the minimum level timing of horizontal scanning period TH of composite signal 803 (which is a composite of the main signal 801 and delay time t1, and level ratio $l_2/l_1 = \frac{1}{2}$ of the in-phase ghost 802) is detected, then signal 804 will be attained. When compared to signal 704 which detects the timing of the horizontal synchronizing signal Hm of the main signal of signal 703, signal 804 which detects the same from signal 803 must cope with a higher level because the picture signal Sg of the in-phase ghost signal is multiplexed over the horizontal synchronizing signal of the main signal. Therefore, the minimum level timing of composite signal 803 becomes the timing of horizontal synchronizing signal Hg of the in-phase ghost signal. In other words, in the case of signal 703, the timing of the horizontal synchronizing signal with the maximum timing Hm can be detected by detecting the minimum level signal. In contrast, if the same detection method is used for signal 803, the timing of the horizontal synchronizing signal Hg of the ghost which has a smaller amplitude is detected, thereby leading to misdetection. Therefore, the chance of misdetection of maximum amplitude of horizontal synchronizing signals can be reduced when in-phase ghosts exist by executing detection of horizontal synchronizing signals during the period after vertical synchronizing signals and equalizing pulse periods within the vertical blanking period, and during horizontal synchronizing signals and color bursts which are not multiplexed with picture signals and teletext signals.

Next, the detection operation of horizontal synchronizing signals with maximum amplitude in FIG. 4 when there is a negative-phase ghost is described using FIGS. 9 and 10.

In the period after the equalizing pulse in the vertical blanking period in which there are only horizontal synchronizing signals which are not multiplexed with picture signals and teletext signals, if the minimum level timing of horizontal scanning period TH of composite signal 903 (which is a composite of the main signal 901 and delay time t2, and level ratio $l_2/l_1 = \frac{1}{2}$ of the in-phase ghost 902) is detected, then signal 904 will be attained. Signal 904 is detecting the timing of the horizontal synchronizing signal Hm of the main signal which has a larger amplitude than the horizontal synchronizing signal Hg of the in-phase ghost signal.

In contrast, in the periods other than the vertical blanking period in which picture signals are multiplexed shown in FIG. 10, if the minimum level timing of horizontal scanning period TH of composite signal 1003 (which is a composite of the main signal 1001 and delay time t2, and level ratio $l_2/l_1 = \frac{1}{2}$ of the in-phase ghost 1002) is detected, then signal 1004 will be attained. When compared to signal 904 which detects the timing of the horizontal synchronizing signal Hm of the main signal of signal 903, signal 1004, which was detected from signal 1003, detects the picture signal Sg which is the inverted ghost signal because its level is lower than the horizontal synchronizing signal Hm of the main signal of signal 1003. In other words, signal 903 detects the timing of the horizontal synchronizing signal Hm with the maximum amplitude by detecting the signal with the minimum level. In contrast, if the same method is used for signal 1003, the timing of picture signal Sg of the ghost signal is detected, leading to misdetection. Therefore, the chance of misdetection of maximum amplitude of horizontal synchronizing signals can be reduced when negative-phase ghosts exist, in the same manner as for in-phase ghosts, by executing detection of horizontal synchronizing signals during the period after vertical synchronizing signals and equalizing pulse periods within the vertical blanking period, and during horizontal synchronizing signals and color bursts which are not multiplexed with picture signals and teletext signals.

Therefore, from FIGS. 7, 8, 9 and 10, we can see that when ghost signals exist, the video data of ADC 407 which is attained at the leading edge timing of the output signal of continuity detector 409 and the address data of counter 416 for the period after vertical synchronizing signals and equalizing pulse periods within the vertical blanking period, and during horizontal synchronizing signals and color bursts which are not multiplexed with picture signals and teletext signals should be stored in data storage 412 as shown in the application example in FIG. 4. Then, the maximum level signal for each horizontal scanning frequency should be detected by maximum value detector 413 from the stored video data. This method is better than the method in which the video data of ADC 407 which is attained at the leading edge timing of the output signal of continuity detector 409 alone is stored in data storage, then the maximum value for each horizontal scanning period is detected by maximum value detector 413 from the stored video data because the chances of misdetection of the horizontal synchronizing signal with the maximum amplitude is smaller.

Next, the details of the operation of the signal inverter 405 and peak clamper 406 in FIG. 4 will be described.

Figure 11:
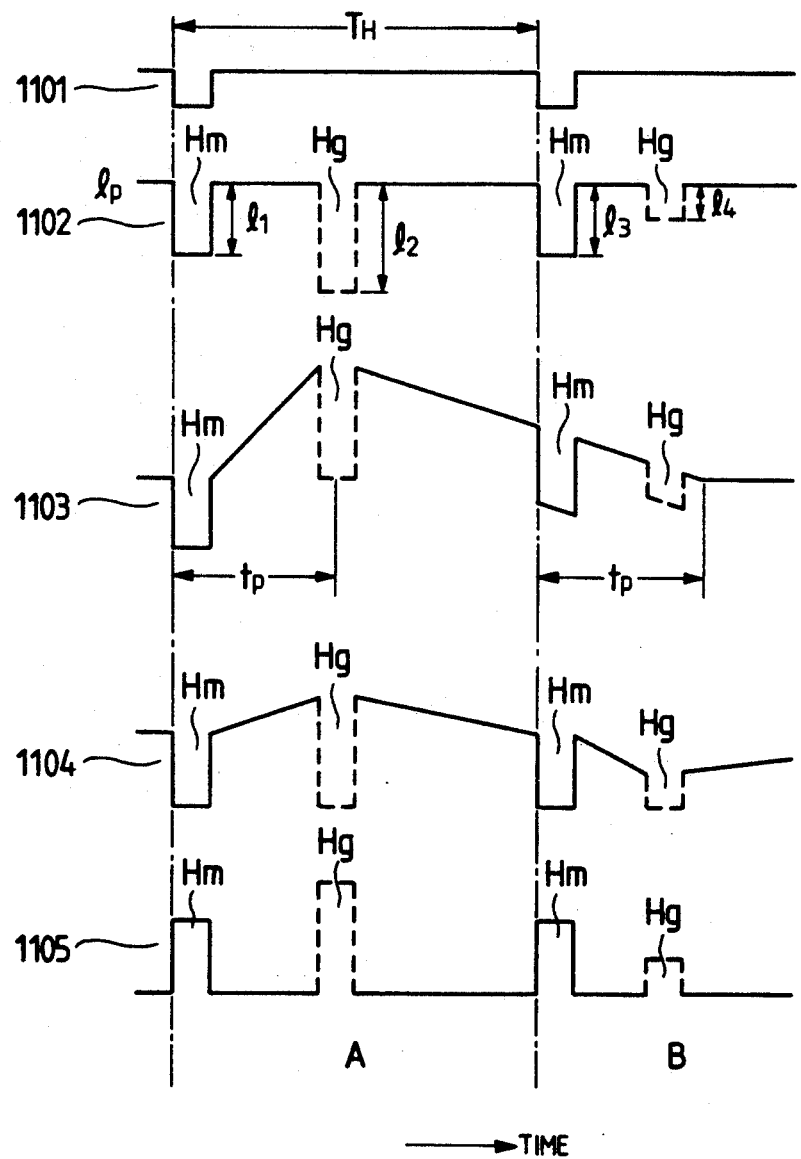
FIG. 11 is a timing chart of signal waveforms necessary to explain operations of a signal inversion circuit and peak clamp circuit in the time difference detector shown in FIG. 4.

FIG. 11 is a timing chart for explaining the operation. In FIG. 11, a reference numeral 1101 designates the output horizontal synchronizing signal of sync-generator 108 in FIG. 1, 1102 the output video signal of LPF 404 in FIG. 4, 1103 the signal created by pedestal clamping signal 1102, 1104 the signal created by peak clamping signal 1102, and 1105 designates the output signal of peak clamper 406 in FIG. 4 which is signal 1102 which has been inverted and peak clamped. Furthermore, in this figure, the broken lines indicate the horizontal synchronizing signals created by ghosts which are represented by Hg. The horizontal synchronizing signals of the main signal are shown by the solid lines and represented by Hm. The pedestal level is represented by $l_p$, and $l_1$, $l_2$, $l_3$ and $l_4$ represent the various horizontal synchronizing signal levels. TH represents the horizontal scanning period, and tp represents the timing of pedestal clamping. Because this diagram is simplified, the color burst signals have been abbreviated.

Conventionally, in order to execute analog/digital conversion of video signal 1102 through the ADC, either the method to stabilize the pedestal level by pedestal clamping video signal 1102 or the method to align the lower end of the horizontal synchronizing signals by peak clamping them was used, so that signal 1102 would not deviate from the sampling range of the ADC. The pedestal clamping method allows relatively easy clamping if the signal does not include any ghosts because the time tp from the horizontal synchronizing signal to the pedestal level lp is known. If a ghost signal is added to the location which should be occupied by pedestal level lp as in range A of signal 1102 and it is causing a level change, however, pedestal clamping of signal 1102 will cause greater distortion of signal 1102, so that it becomes similar to signal 1103.

In the peak clamping method, aligning the bottom level of horizontal synchronizing signals l1, l2, l3 and l4 of signal 1102 causes the output to become similar to signal 1104. Therefore, it becomes impossible to detect the timing of the minimum level of one horizontal scanning period as described in FIG. 4 and use this timing for the timing of the horizontal synchronizing signal of the maximum amplitude.

Therefore, the fact that the detection range of the horizontal synchronizing signal in the method described in FIG. 4 is the period after vertical synchronizing signals and equalizing pulse periods within the vertical blanking period, and during horizontal synchronizing signals and color bursts which are not multiplexed with picture signals and teletext signals is utilized to invert signal 1102 and peak clamp it. This will cause the inverted pedestal level to be constant, so that it is the output signal is similar to 1105. If the timing of the maximum level signal is detected for each horizontal scanning frequency TH in signal 1105, the timing will become the timing of the horizontal synchronizing signal of the maximum amplitude. Thus, in the method in which the input video signal of FIG. 4 is inverted by signal inverter 405 and clamped with peak clamper 406, the pedestal level of the video signal after vertical synchronizing signals and equalizing pulse periods within the vertical blanking period, and during horizontal synchronizing signals and color bursts which are not multiplexed with picture signals and teletext signals is constant, so that ADC sampling is stable and detection of horizontal synchronizing signals is simple.

Figure 12:
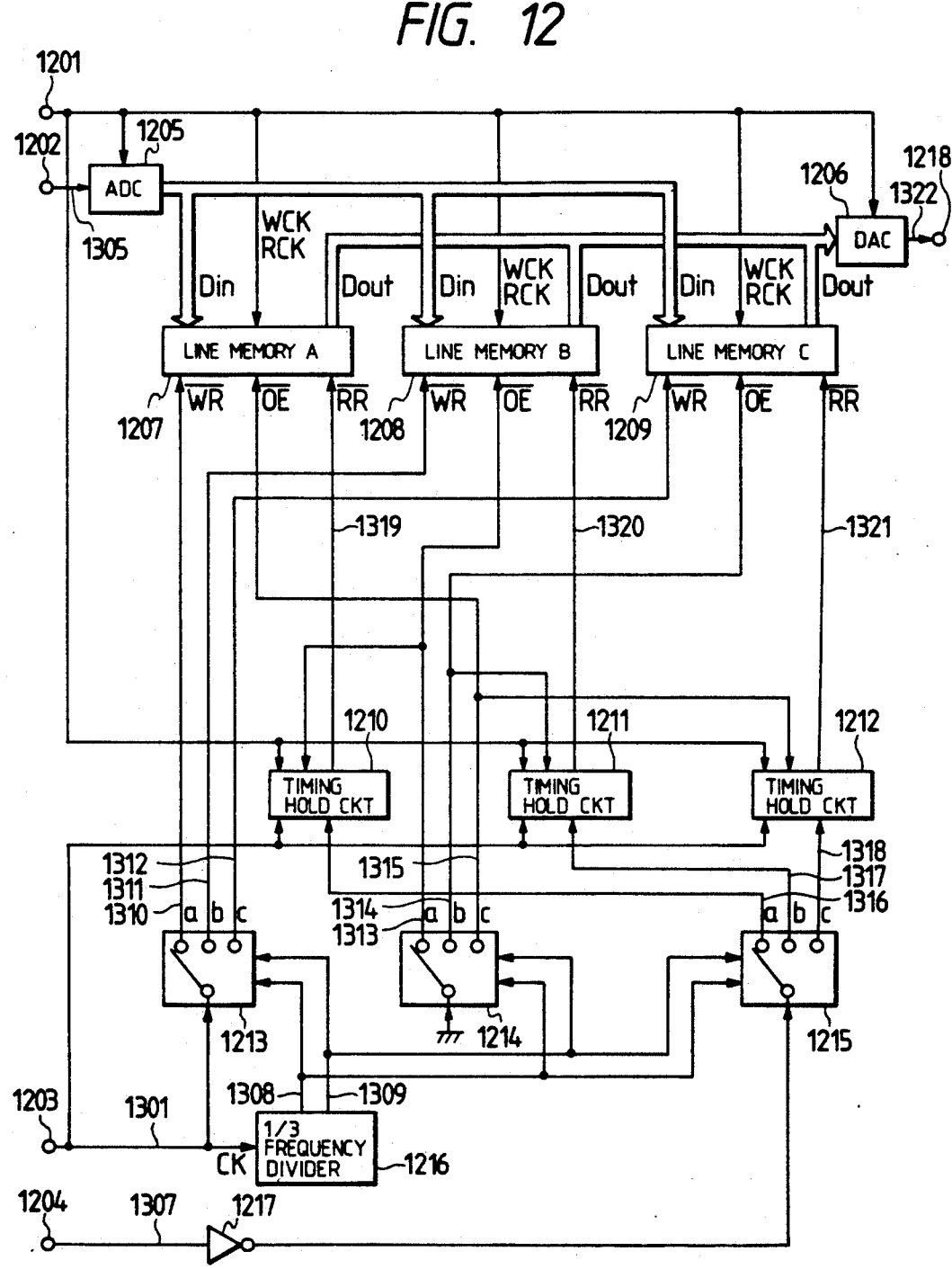
FIG. 12 is a block diagram showing an example of a variable delay circuit in the television receiver shown in FIG. 1.

Next, one actual example of the variable delay circuit 105 in the embodiment in FIG. 1 is given in FIG. 12. In this diagram, a reference numeral 1201 denotes an input terminal of the master clock (4 fsc), 1202 an input terminal for the output video signal of video detector 104 in FIG. 1, 1203 an input terminal for the output horizontal synchronizing signal of the sync-generator 108 in FIG. 1, 1204 an input terminal for the output signal of variable delay circuit controller 414 in FIG. 4, 1205 an analog/digital converter (ADC), reference numerals 1206 a digital/analog converter (DAC), 1207, 1208 and 1209 denote line memories, 1210, 1211 and 1212 timing hold circuits, 1213, 1214 and 1215 switches, a reference numeral 1216 denotes a ¼ frequency divider, 1217 an inverter, and 1218 an output terminal for DAC 1206.

Figure 13:
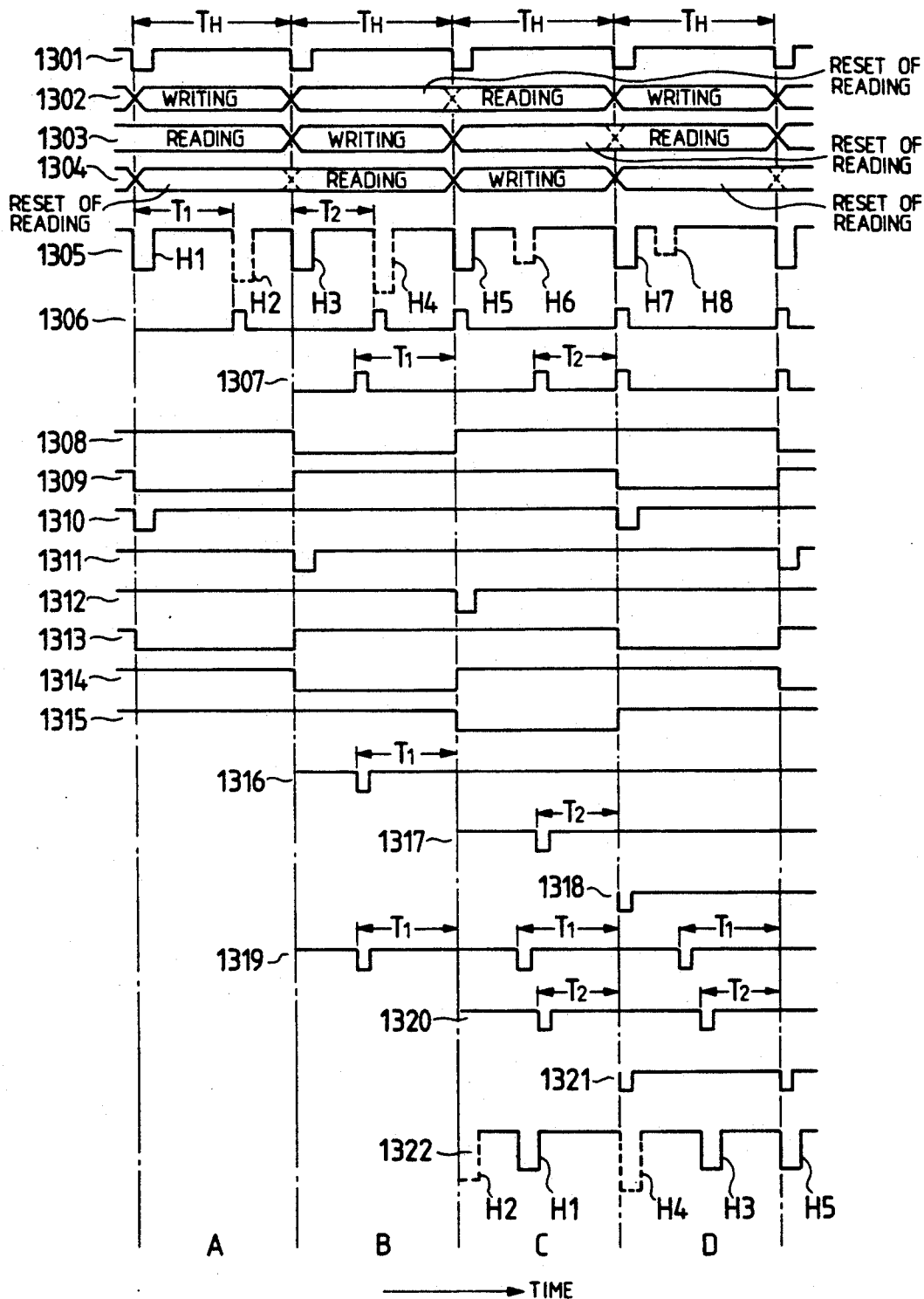
FIG. 13 is a timing chart of signal waveforms of various sections of the variable delay circuit shown in FIG. 12.

FIG. 13 is a timing chart of the various signal of the circuits in FIG. 12. In FIG. 13, a reference numeral 1301 designates the output horizontal synchronizing signal of the sync-generator 108 in FIG. 1, 1302 indicates the internal status of line memory A 1207, 1303 indicates the internal status of line memory B 1208, 1304 indicates the internal status of line memory C 1209, 1305 denotes the output signal of video detector 104 in FIG. 1, 1306 denotes a signal which is obtained by detecting the minimum level of signal 1305, 1307 denotes the output signal of variable delay circuit controller 414 in FIG. 4, 1308 denotes a lower bit output signal of ¼ frequency divider 1216, 1309 denotes a higher bit output signal, reference numerals 1310, 1311 and 1312 denote output signals of switch 1213, 1313, 1314 and 1315 are the output signals of switch 1214, 1316, 1317 and 1318 denote output signals of switch 1215, a reference numeral 1319 denotes an output signal of timing hold circuit 1210, 1320 denotes an output signal of timing hold circuit 1211, 1321 denotes an output signal of timing hold circuit 1212, and 1322 denotes an output signal of DAC 1206.

The circuit operation will be described while referring to FIGS. 12 and 13.

The input signal 1305 which is input from input terminal 1202 is converted from analog to digital in ADC 1205, then sequentially written to line memory 1207, 1208 and 1209. In regard to signal 1305, the solid lines represent the original signal (main signal), and the broken lines represent the ghost signal added by ghost phenomenon. H1, H3, H5, and H7 are the original horizontal synchronizing signals, and H2, H4, H6 and H8 are horizontal synchronizing signals created by the ghost. The clock for ADC 1205, the write and read clocks for line memory 1207, 1208 and 1209, and the clock for DAC 1206 are synchronized by the 4 fsc (a frequency 910 times greater than the horizontal synchronizing frequency fH) clock signal which is input from terminal 1201. The line memory is memory such as Hitachi's HM63021P, and in this example HM63021P is actually used. The mode setting is at the time axis expansion mode, and We is fixed at low.

As is shown in FIG. 4, the variable delay circuit controller 414 uses signal 1306 which is attained by detecting the timing of the minimum level of input signal 1305 (the maximum level in FIG. 4 because the signal is inverted) to attain signal 1307.

The output signal 1301 of the sync-generator 108 in FIG. 1 is divided into three parts by the ⅓ frequency divider 1216 to attain signal 1308 for the lower bit output and signal 1309 for the higher bits. Switches 1213, 1214 and 1215 are controlled by signals 1308 and 1309. When signal 1308 is high and signal 1309 is low, the left output terminal a is connected to the input terminal. When signal 1308 is low and signal 1309 is high, the central output terminal b is connected to the input terminal. When signal 1308 is high and signal 1309 is high, the right output terminal c is connected to the input terminal. The output terminals which are not connected to the input terminal output high. Signal 1301 is input to switch 1213, so that terminal a attains signal 1310, terminal b attains signal 1311, and terminal c attains signal 1312. The input terminal of switch 1214 is grounded, so that output terminal a attains signal 1313, output terminal b attains signal 1314, and output terminal c attains signal 1316. The signal 1307 is inverted by inverter 1217 and input to switch 1215, so that output terminal a attains signal 1316, output terminal b attains signal 1317, and output terminal c attains signal 1318.

The signal 1316 is input to the timing hold circuit 1210, then within the 3H period a signal is output at the same timing as the input signal each H to attain signal 1319. In the same manner, signal 1317 is input to the timing hold circuit 1211 to attain output signal 1320, and signal 1318 is input to the timing hold circuit 1212 to attain output signal 1321.

The signal 1310 is input to line memory 1207 as the WR (read?? write reset) signal, signal 1315 is input as the OE (output enable) signal, and signal 1319 is input as the RR (read reset) signal.

The line memory HM63021P can execute read/write operations independently, and because it has internal addresses, the address can be incremented by the clock. In the time axis compression mode, the write stop function automatically stops writing after data is written to addresses 0 through 2047. When a write reset signal is received again, data is written from address 0 again. Therefore, if the clock is 4 fsc, 910 addresses will be used in 1H so that if one write reset is used every 3H as in signal 1310, then the preceding data will not be overwritten.

Because signal 1319 has pulses at the same timing for each H during a 3H period at a point before range C which is the delay time T1 of horizontal synchronizing signal H2 of the maximum amplitude of the data written in range A before range C, if read reset is executed by signal 1319, then data will be read sequentially from horizontal synchronizing signal H2 data in range C. After the data stored in addresses up to internal address 909 is output, the second read reset will be executed by signal 1319, then the data written in range A will be read sequentially from internal address 0. The status of line memory 1207 will be indicated by 1302. Data is written during the first 1H, read reset is executed in the second H period, then data is read in the last H period.

The operation for line memory 1208 and 1209 are the same as that for line memory 1207, the only exception being that operation is different by 1H. The data which is read is converted from digital to analog by DAC 1206 to attain signal 1322.

Figure 14:
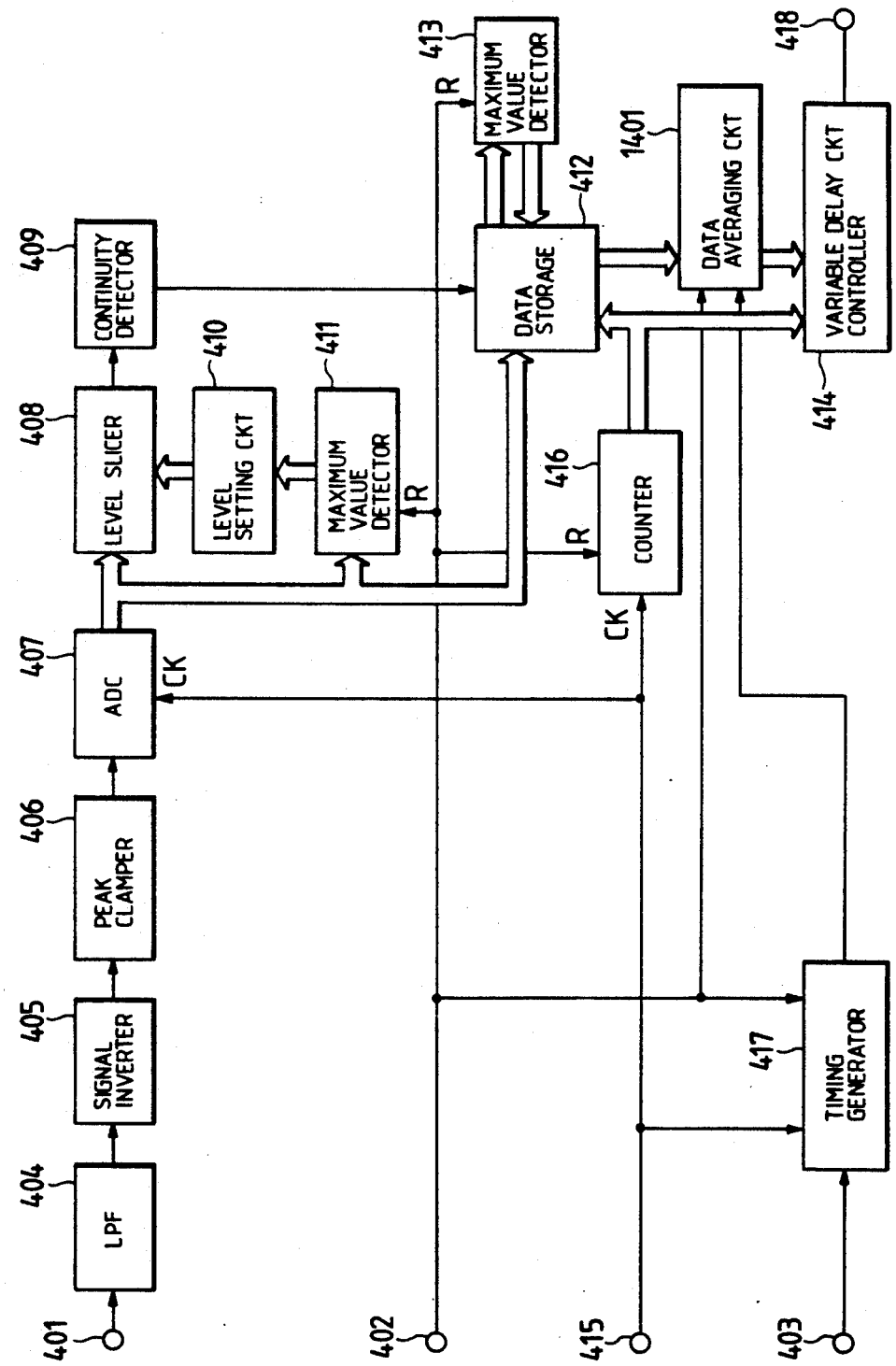
FIGS. 14, 15, 16, 17, 18 and 19 are block diagrams of other examples of time difference detectors for the television receiver shown in FIG. 1.

FIG. 14 is a block diagram which shows another example of the time difference detector in FIG. 1. In this diagram, 1401 is the data averaging circuit. The symbols which have the same designations as in FIG. 4 have the same meanings.

The example in FIG. 14 differs from that in FIG. 4 in that the average of the address data detected from the period after vertical synchronizing signals and equalizing pulse periods within the vertical blanking period, and during horizontal synchronizing signals and color bursts which are not multiplexed with picture signals and teletext signals of all output address data in data storage 412 is calculated by the data averaging circuit 1401. This average address data may be output to the variable delay circuit controller 414. Therefore, the output address data of data averaging circuit 1401 changes every cycle of the vertical synchronizing signal.

In the example in FIG. 4, only the address data which is detected during the last horizontal synchronizing period in the period after vertical synchronizing signals and equalizing pulse periods within the vertical blanking period, and during horizontal synchronizing signals and color bursts which are not multiplexed with picture signals and teletext signals is changed, so that the timing of output signals from variable control circuit 414 during periods of multiplexed picture signal other than vertical blanking signals is constant. In the example in FIG. 14, however, the timing of the output signal of variable control circuit 414 is decided by data which is the average of multiple address data which was taken only from the period after vertical synchronizing signals and equalizing pulse periods within the vertical blanking period, and during horizontal synchronizing signals and color bursts which are not multiplexed with picture signals and teletext signals.

Therefore, in the example in FIG. 4, if detection of the horizontal synchronizing signal of the maximum amplitude in the last horizontal synchronizing period of the vertical blanking period is mistaken, then the image on the television screen will differ for the period until the next vertical blanking period. In the example in FIG. 14, however, even if detection of the maximum amplitude in the last horizontal synchronizing period is mistaken, the degree of error can be reduced by averaging, so that this has the effect of stabilizing the image on the television screen.

Figure 15:
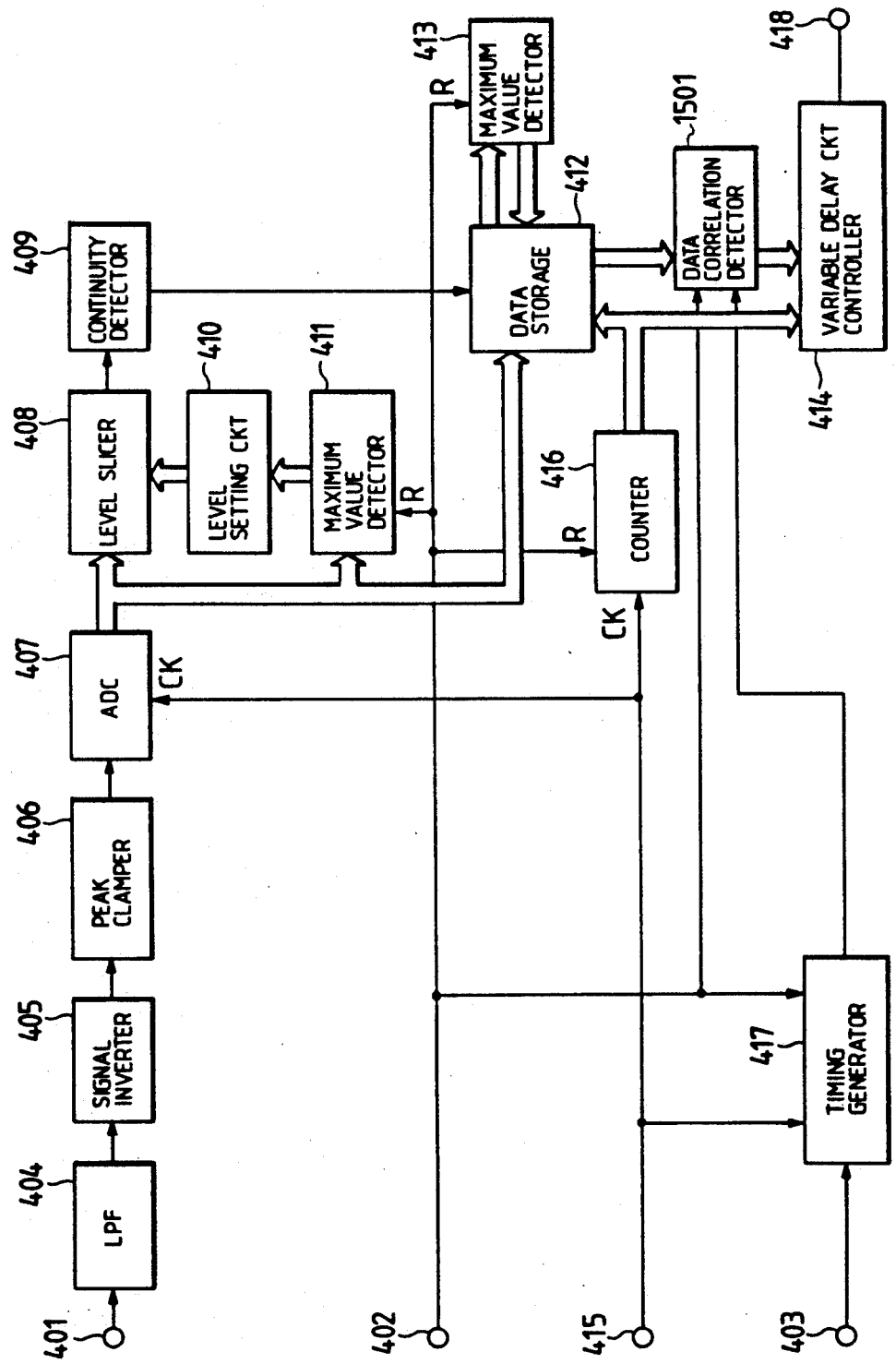

FIG. 15 is a block diagram of yet another actual example of the time difference detector 106 in FIG. 1. In this diagram, 1501 is the data correlation detector. Also, the symbols which are the same as those in FIG. 4 have the same functions.

The example in FIG. 15 differs from that in FIG. 4 in that the correlations between the address data in the period after vertical synchronizing signals and equalizing pulse periods within the vertical blanking period, and during horizontal synchronizing signals and color bursts which are not multiplexed with picture signals and teletext signals of all output address data in data storage 412 is sequentially detected, and any data which differs significantly from previous data is ignored. If, however, data which is significantly different from previous data continues to be detected, then the different data will be given priority.

Therefore, in the example in FIG. 4, as has already been described for FIG. 14, if the output timing of variable delay circuit controller 414 is fixed until the next vertical blanking period with address data which has had its timing detected by detection of the horizontal synchronizing signal of the maximum amplitude in the last horizontal synchronizing period of the vertical blanking period, then misdetection of the horizontal synchronizing signal of the maximum amplitude will most likely cause distortion of the image on the television screen until the next vertical blanking period. In the example in FIG. 15, however, data is sequentially compared with previous address data, and significantly different address data which is attained through misdirection is ignored, so that the image on the television screen is stabilized.

Figure 16:
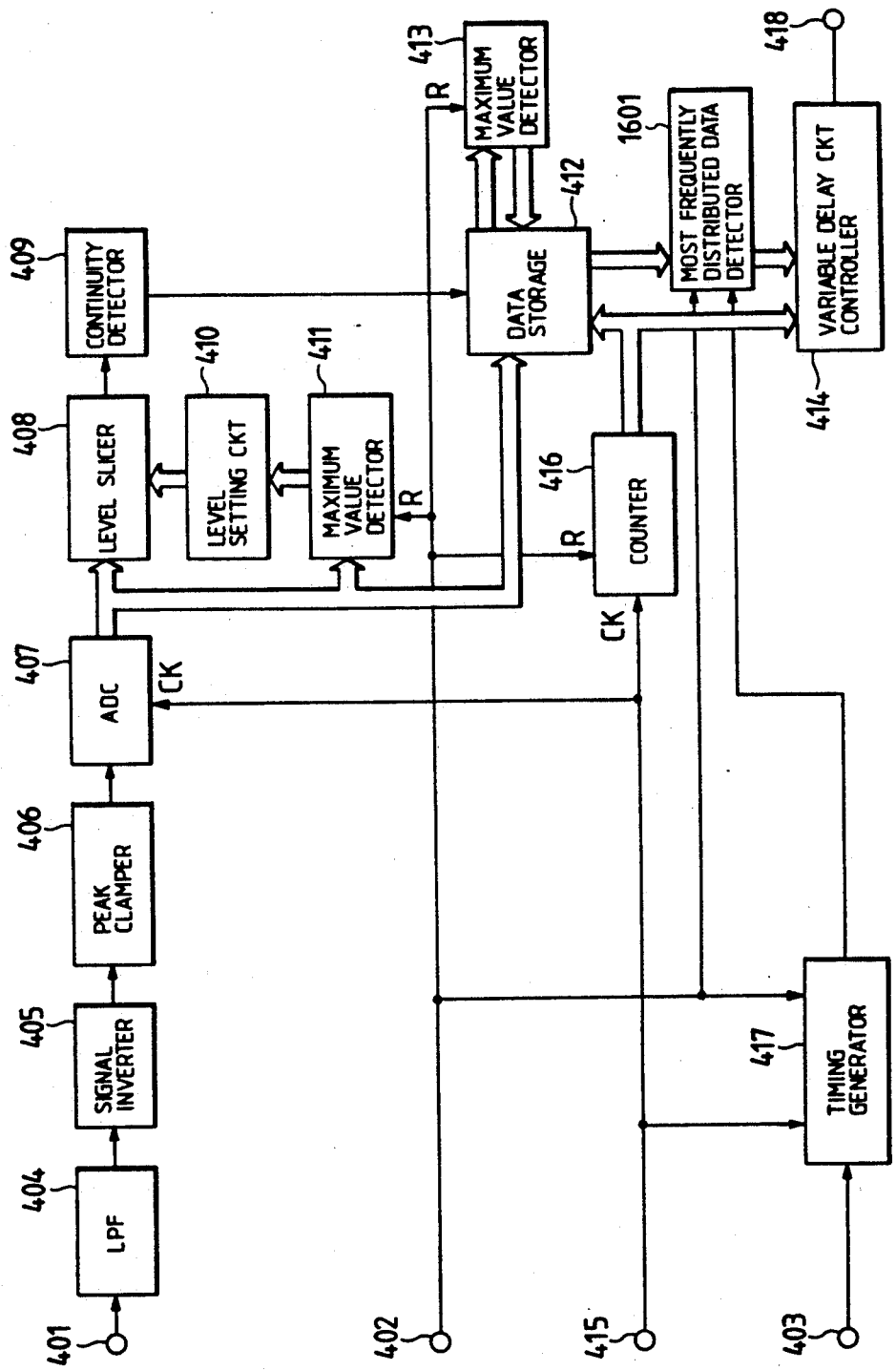

FIG. 16 is a block diagram of yet another actual example of the time difference detector 106 in FIG. 1. In this diagram, 1601 is the most frequently distributed data detector. Also, the symbols which are the same as those in FIG. 4 have the same functions.

The example in FIG. 16 differs from that in FIG. 4 in that the most frequent distribution of address data detected only in the period after vertical synchronizing signals and equalizing pulse periods within the vertical blanking period, and during horizontal synchronizing signals and color bursts which are not multiplexed with picture signals and teletext signals of all output address data in data storage 412 is detected by most frequently distributed data detector 1601, then the most frequently distributed address data which was detected is output to variable delay circuit controller 414.

Therefore, as has been described for FIG. 14, in the example in FIG. 4, if the output timing of variable delay circuit controller 414 is fixed until the next vertical blanking period with address data which has had its timing detected by detection of the horizontal synchronizing signal of the maximum amplitude in the last horizontal synchronizing period of the vertical blanking period, then misdetection of the horizontal synchronizing signal of the maximum amplitude will most likely cause distortion of the image on the television screen until the next vertical blanking period. In the example in FIG. 16, however, the address data which is most frequently distributed is selected, so that the probability of selecting data which is significantly different is low, and, therefore, it has the effect of stabilizing the image on the television screen.

Figure 17:
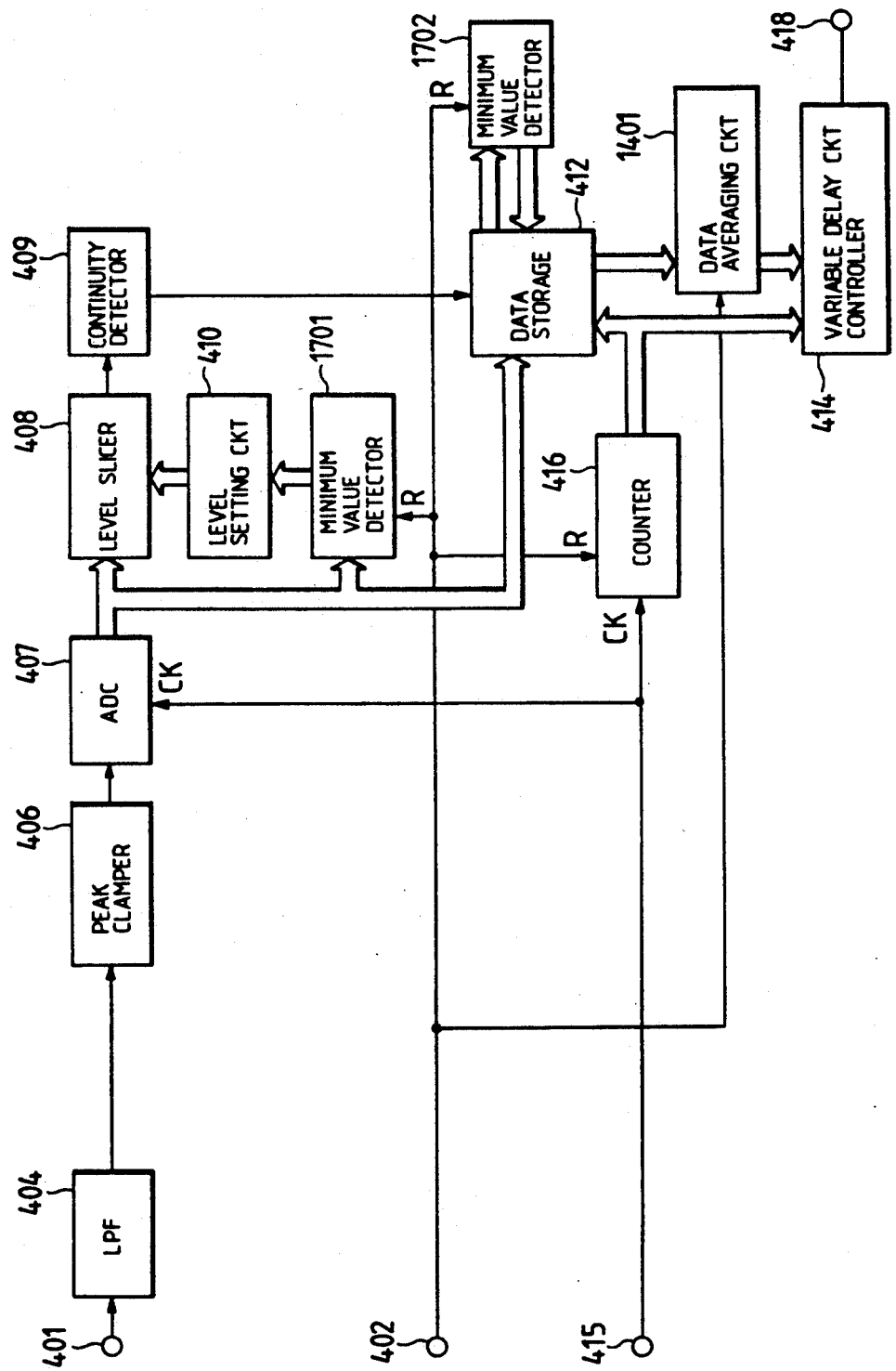

FIG. 17 yet another actual example of the time difference detector 106 in FIG. 1. In this diagram, the symbols which are the same as those in FIG. 4 and FIG. 14 have the same functions. Also, 1701 is the minimum value detector, and 1702 is another minimum value detector.

The difference between this example and that in FIG. 14 is that in the example in FIG. 14, the data averaging circuit 1401 was controlled by the timing generator 417. In the example in FIG. 17, however, timing generator 417 is eliminated, and any limitations to the period of address data which is averaged by data averaging circuit 1401 are removed. Also, because stable analog/digital conversion is executed during the entire video signal period by ADC 407, signal inverter 405 has been eliminated, and the output signal of LPF 404 is input as it is to the peak clamper 406. In addition, signal inverter 405 has been removed so that there is no more signal inversion, thus, the maximum value detectors 411 and 413 in FIG. 14 have been changed to minimum value detectors 1701 and 1702.

In the example in FIG. 14, when the output vertical synchronizing signal of sync-generator 108 in FIG. 1, which was input from terminal 403, cannot synchronize with the vertical synchronizing signal of the video signal and the timing differs because of a ghost, the timing of the output signal of timing generator 417 would also differ, so that the period which is averaged by the data averaging circuit 1401 would differ from the period after vertical synchronizing signals and equalizing pulse periods within the vertical blanking period, and during horizontal synchronizing signals and color bursts which are not multiplexed with picture signals and teletext signals. Although this period differs according to the broadcasting station, the maximum is about 10H periods, and the average is small, so that if the timing of this period differs, then the size of the error will also increase. In the example in FIG. 17, however, the average period is not fixed and the average number can also be set arbitrarily, so that even if the output vertical sync-separation circuit signal of the sync-generator in FIG. 1 is unstable, this has the effect of stabilizing the variable delay circuit controller signals.

Figure 18:
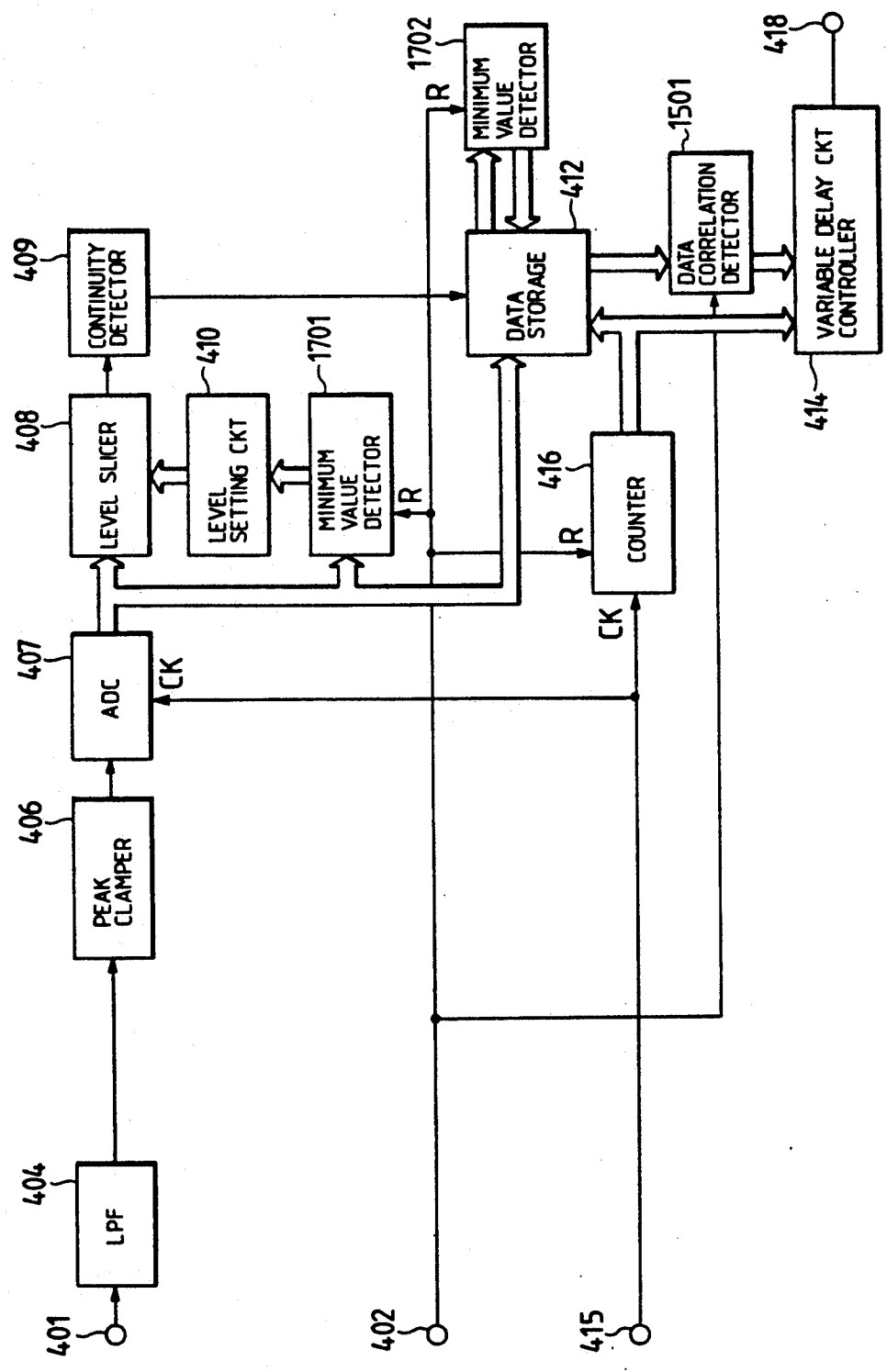

FIG. 18 is another example of the time difference detector 106 in FIG. 1. In this diagram, the symbols which are the same as those in FIG. 4, FIG. 15 and FIG. 17 have the same functions. The example in FIG. 18 differs from that in FIG. 15 in that timing generator 417 and signal inverter 405 have been eliminated, and maximum value detector 411 and 413 have been replaced by minimum value detectors 1701 and 1702.

The example in FIG. 18 is similar to that in FIG. 17 in that even if the output vertical synchronizing signal of sync-generator 108 in FIG. 1 is unstable, it allows stable output of variable delay circuit controller signals.

Figure 19:
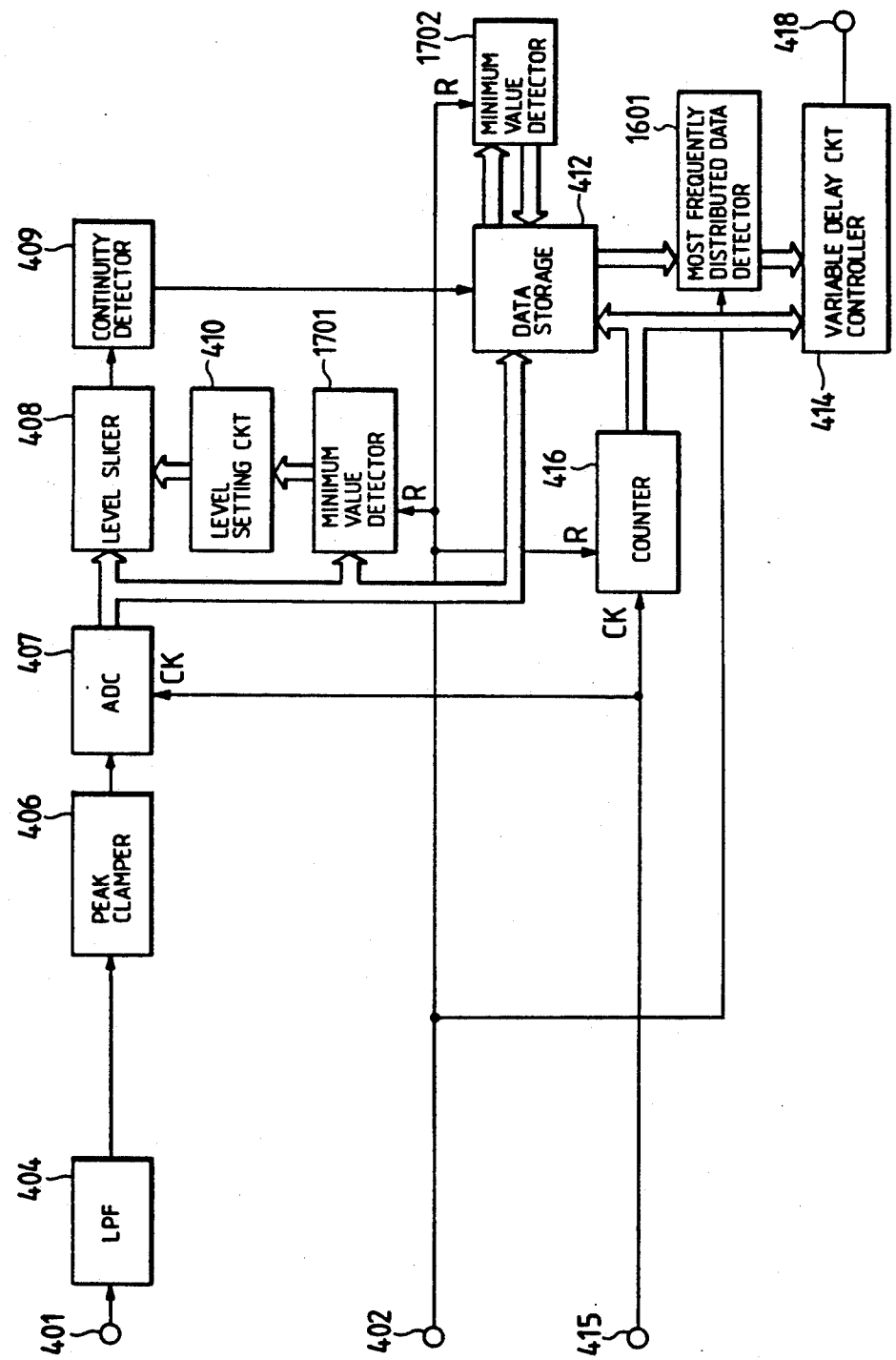

FIG. 19 is another example of the time difference detector 106 in FIG. 1. In this diagram, the symbols which are the same as those in FIG. 4 and FIG. 16 have the same functions. The example in FIG. 19 differs from that in FIG. 16 in that the timing generator 417 and signal inverter 405 have been removed, and the maximum value detectors 411 and 413 have been replaced by minimum value detectors 1701 and 1702.

The example in FIG. 19 is similar to that in FIG. 17 in that even if the output vertical synchronizing signal of sync-generator 108 in FIG. 1 is unstable, it allows stable output of variable delay circuit controller signals.

Figure 20:
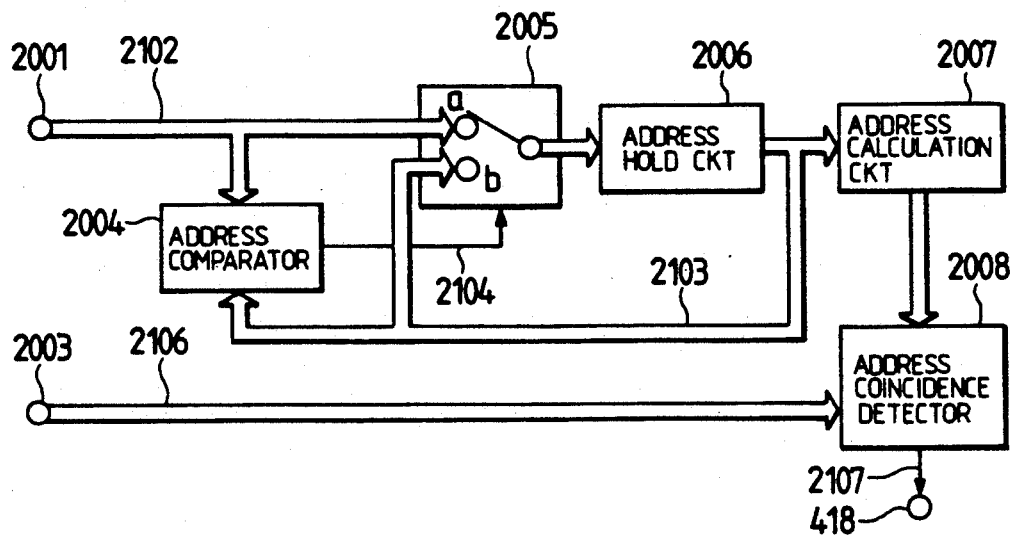
FIG. 20 is a block diagram showing an example of a variable delay circuit controller in the time difference detector shown in FIG. 4.

FIG. 20 is a block diagram which shows an example of the variable delay circuit controller 414 in FIG. 4. In this diagram, a reference numeral 2001 denotes an input terminal to which the output address data from data storage 412 in FIG. 4 are input, 2003 an input terminal to which the output address data from counter 416 are input, 2004 an address comparator, 2005 a switch, 2006 an address hold circuit, 2007 an address calculation circuit, and 2008 an address coincidence detector.

Figure 21:
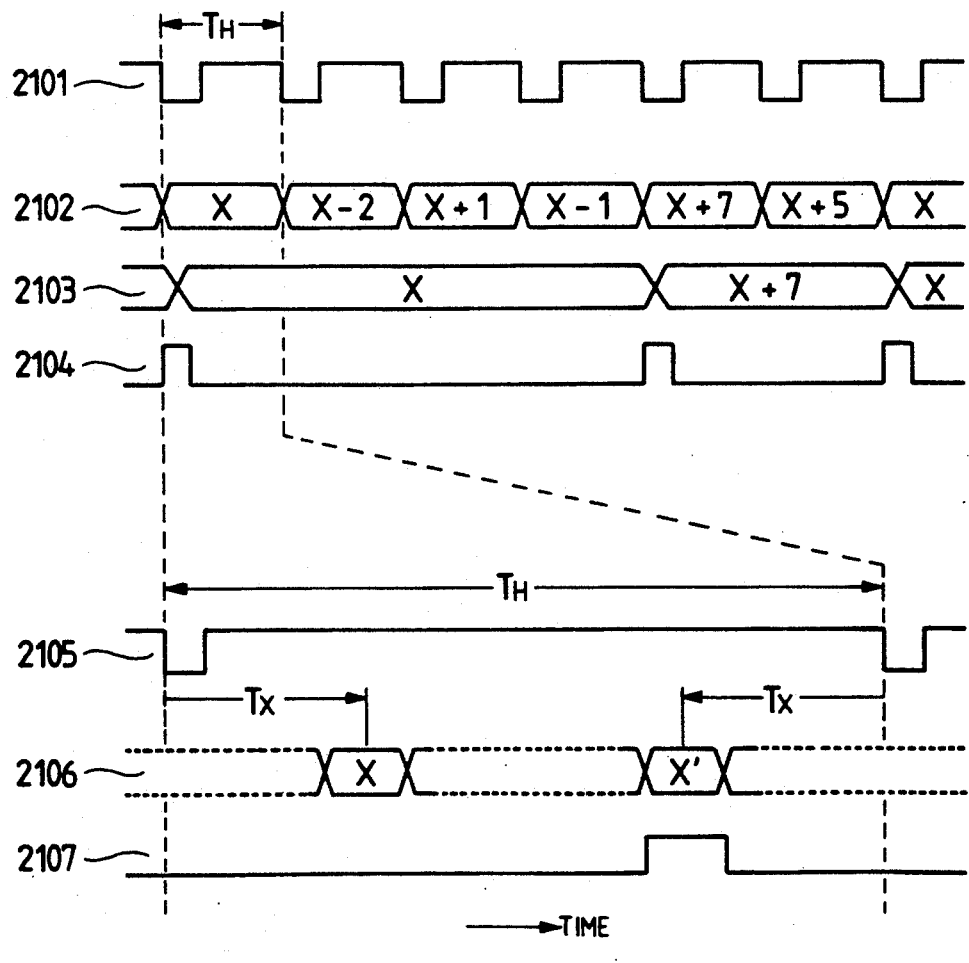
FIG. 21 is a timing chart of signals of various sections of the time difference detector shown in FIG. 4.

FIG. 21 is a timing chart of the various signals from the circuits in FIG. 20. In FIG. 21, 2101 is the horizontal synchronizing signal, 2102 is the output address data row of data storage 412, 2103 is the output data row of address hold circuit 2006, 2104 is the output signal of address comparator 2004, 2105 is the time axis expansion diagram of horizontal synchronizing signal 2101, 2106 is the output address data row of counter 416, and 2107 is the output signal of address coincidence detector 2008. Also, the character x indicated in 2102, 2103 and 2106 is the address value.

The operation of the circuits will be described while referring to FIG. 20 and FIG. 21. Address comparator 2004 compares output address data row 2102 of data storage 412, which is input from input terminal 2001 every horizontal scanning cycle TH, and output address data row 2103 of address hold circuit 2007. If the difference between the value of address data row 2102 and the value of address data row 2103 is greater than a given reference value, then high is output to attain signal 2104. If the difference is less than the reference value, then low is output to attain signal 2104. (In this example, the difference reference value is q3.) If the output signal 2104 of the address comparator 2004 is high, switch 2005 is controlled so that input terminal a is selected. If signal 2104 is low, then terminal b is selected. The address data which is selected by switch 2005 is output for one horizontal scanning period TH by address hold circuit 2006. As is indicated by 2106, if the output address data x of address hold circuit 2006 is an address a period of Tx after the horizontal synchronizing signal which is the output data of counter 416 in FIG. 4, then the address calculation circuit 2007 calculates the address x' which is a period Tx before the next horizontal synchronizing signal, and outputs the result to address coincidence detector 2008. Address coincidence detector 2008 detects the timing at which the output address data of the address calculation circuit and the address data row 2106 of counter 416 in FIG.

In this example, address comparator circuit 2004 and switch 2005 compare the output address data of address hold circuit 2006 and the output address data of data storage 412 in FIG. 4. If the difference does not exceed the range which is used as reference, the output address data of data storage circuit 412 is ignored, and the output address of address hold circuit 2006 is selected. Therefore, as is shown in FIG. 4, even if there are minute changes in the output address data of the data storage caused by minute jittering of the timing detection signal of the horizontal synchronizing signal, if the changes are within the reference range of address comparator circuit 2004, then the switch will select input terminal b to fix the output address. This will absorb any jitters in timing detection of the horizontal synchronizing signal. If the level ratio which is the DU ratio between the original signal and ghost signal should be inverted, and the timing of the horizontal synchronizing signal and output address data of data storage 412 should change drastically, the switch will select input terminal a and output the address data of data storage 412. This allows this example to follow any major changes in the timing of horizontal synchronizing signals.

Therefore, if this example is used, besides absorbing minute jitters in the timing detection of horizontal synchronizing signals, the DU ratio between the original signal and ghost signal will be inverted, and any major changes in the timing of horizontal synchronizing signals will be followed. Thus, color distortion and monotone display of color images on television screens caused by jitters in the timing detection of horizontal synchronizing signals will be prevented, and horizontal synchronizing signal timing deviations caused by DU ratio inversion can be handled.

Figure 22:
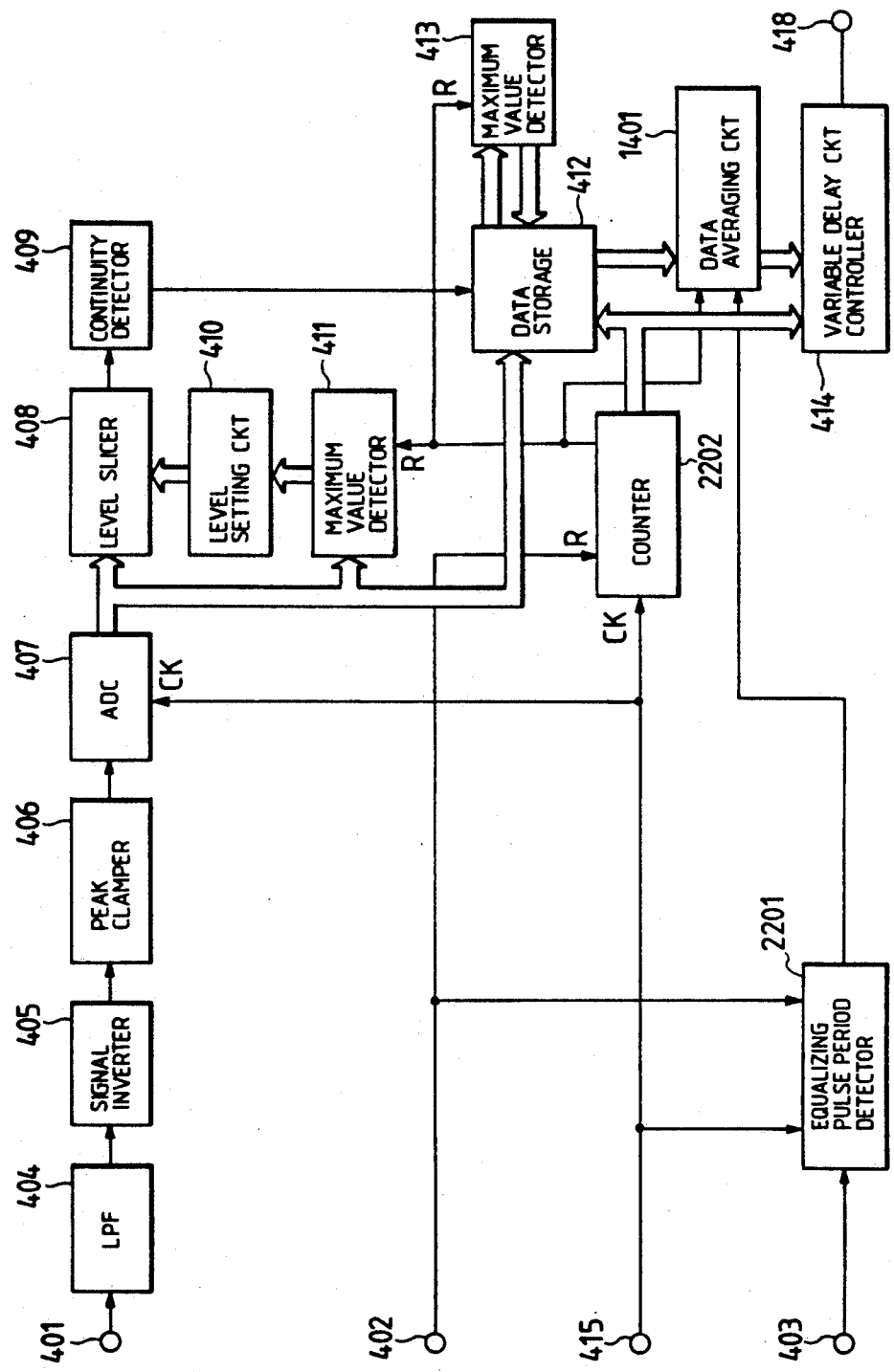
FIGS. 22, 23 and 24 are block diagrams of other examples of time difference detectors in the television receiver shown in FIG. 1.

FIG. 22 is another example of the time difference detector 106 in FIG. 1. In this diagram, a reference numeral 2201 designates an equalizing pulse period detector, and 2202 a counter. In this diagram, the symbols which are the same as those in FIG. 4 and FIG. 14 have the same functions.

The example in FIG. 22 differs from that in FIG. 14 in that data averaging circuit 1401 is controlled by the equalizing pulse period detected by the equalizing pulse period detector 2201. In other words, the timing of the equalizing pulse is detected, not the timing of the horizontal synchronizing signal. Therefore, counter 2202 is a counter which considers a cycle to be one-half of the horizontal scanning period TH, and resetting is executed by either the reset pulse which is created for each TH/2 by dividing the clock which is input through input terminal 415 or the horizontal synchronizing signal for each TH which is input through input terminal 402.

In the future for FIG. 14, signals such as ghost canceller reference signals (GCR signals) may be multiplexed over the period after vertical synchronizing signals and equalizing pulse periods within the vertical blanking period, and during horizontal synchronizing signals and color bursts which are not multiplexed with picture signals and teletext signals, so that periods with only horizontal synchronizing signals and color burst signals will be eliminated, and there is the possibility that stable detection of horizontal synchronizing signals will not be possible because of multiplexed signals. In this example, however, the equalizing pulse period which has little possibility of being multiplexed by new signals is used, so that timing detection of equalizing pulses which are not affected by multiplex signals can be executed. Therefore, variable delay circuit controller signals can be output stably.

Figure 23:
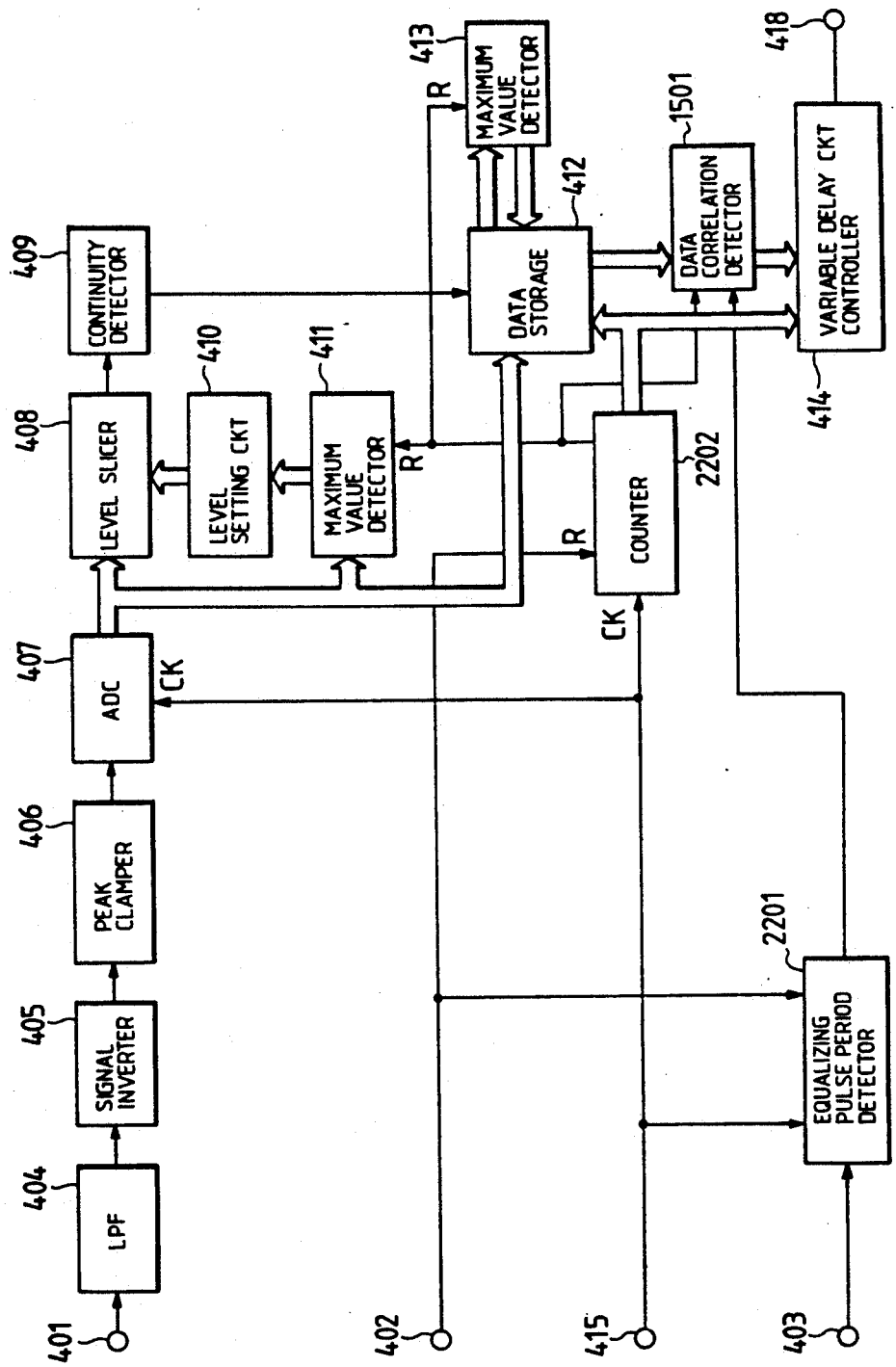

FIG. 23 is a block diagram of another example of time difference detector 106 in FIG. 1. In this diagram, the symbols which are the same as those in FIG. 4, FIG. 15, and FIG. 22 have the same functions.

The example in FIG. 23 differs from that in FIG. 15 in that, in the same manner as in the example in FIG. 22, the timing of the output signal of variable delay circuit controller 414 is decided by timing detection of the equalizing pulse.

In this example, the equalizing pulse period which has little possibility of being multiplexed in the future with new signals is used for detection, so that timing detection of equalizing pulses which are not affected by multiplex signals can be executed. Therefore, variable delay circuit controller signals can be output stably.

Figure 24:
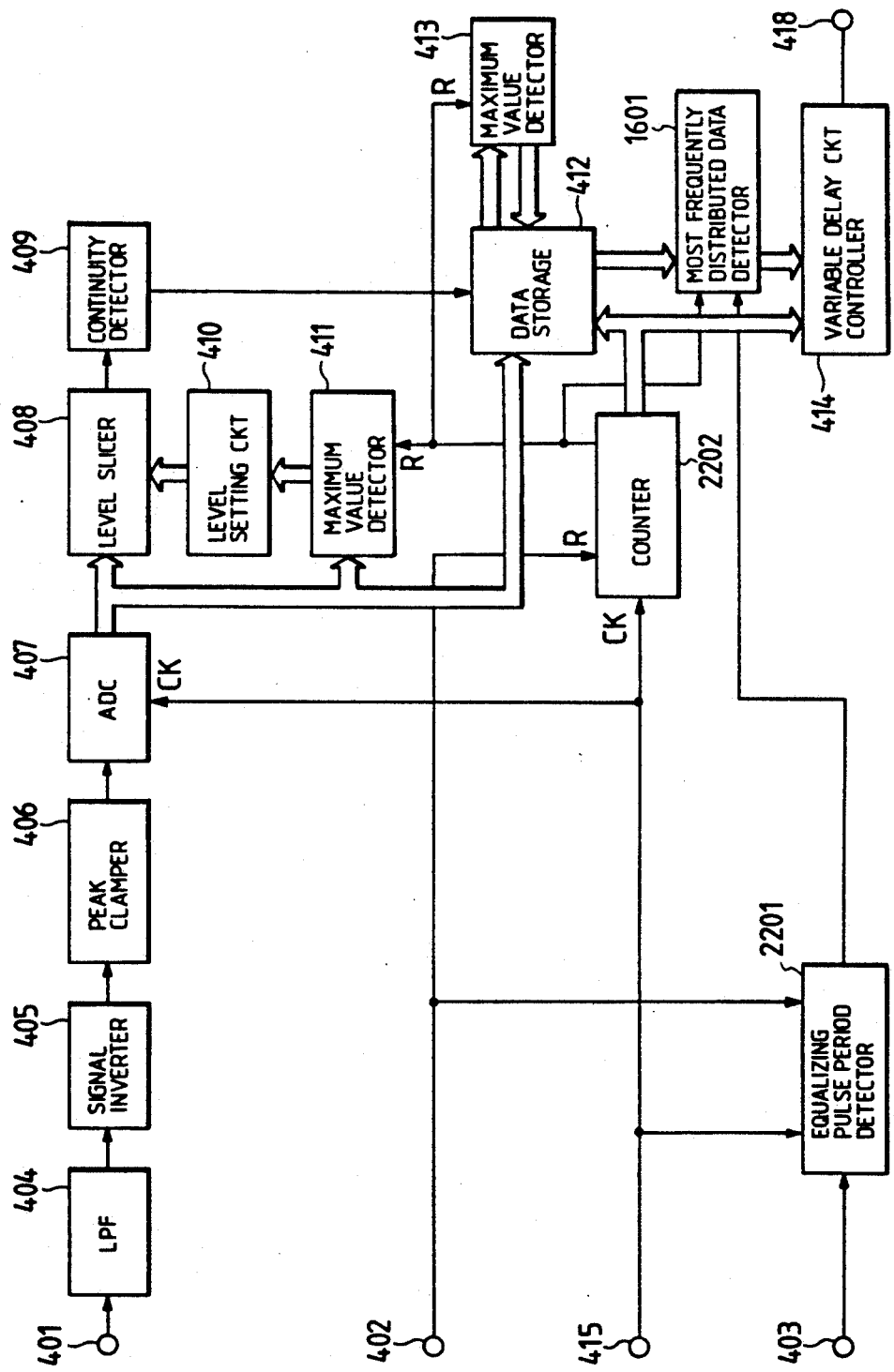

FIG. 24 is a block diagram of another example of time difference detector 106 in FIG. 1. In this diagram, the symbols which are the same as those in FIG. 4, FIG. 16, and FIG. 22 have the same functions.

The example in FIG. 24 differs from that in FIG. 16 in that, in the same manner as in the example in FIG. 22, the timing of the output signal of variable delay circuit controller 414 is decided by timing detection of the equalizing pulse. In this example, the equalizing pulse period which has little possibility of being multiplexed in the future with new signals is used for detection, so that timing detection of equalizing pulses which are not affected by multiplex signals can be executed. Therefore, variable delay circuit controller signals can be output stably.

An example of the sync-generator 108 in FIG. 1 which is a block diagram of one embodiment of the present invention will be described below.

Figure 25:
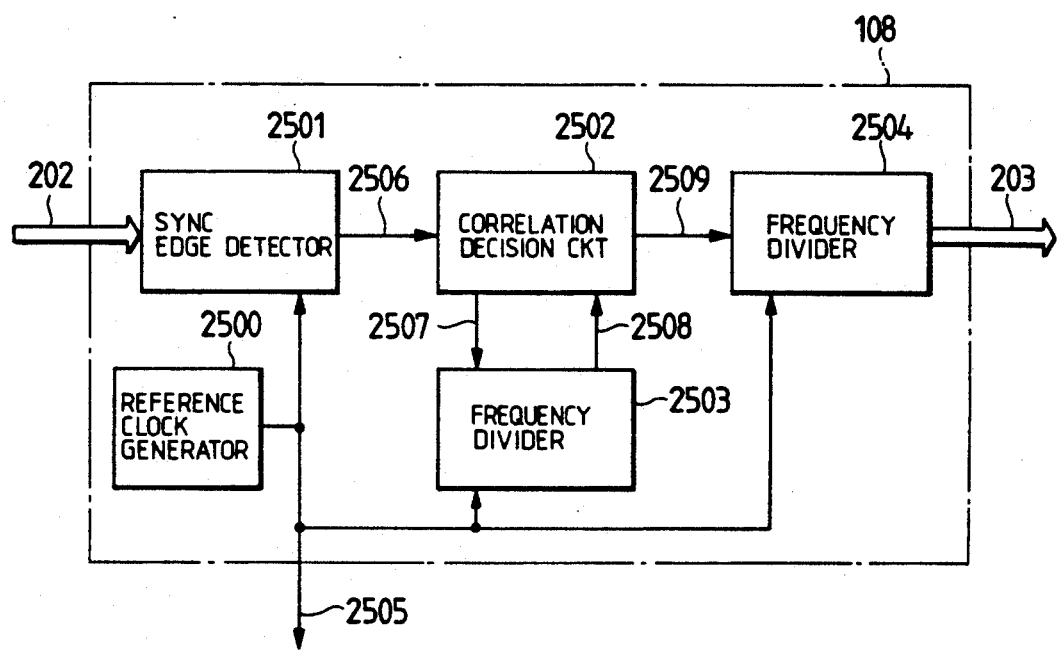
FIG. 25 is a block diagram of an example of a sync-generator in the television receiver shown in FIG. 1.

FIG. 25 is a block diagram of an example of the sync-generator 108.

In this diagram, a reference numeral 2500 designates a reference clock generator which generates a reference clock signal 2505, and if the frequency of this reference clock signal is divided to a certain degree a frequency which is the same as synchronizing signal 202 will be created. A reference numeral 2501 indicates a sync edge detector which detects the input edge of synchronizing signal 202 each time it is input, and outputs this signal as a pulse signal which is synchronized with reference clock 2505. A reference numeral 2503 designates a frequency divider which divides the frequency of reference clock signal 2505 and outputs a pulse signal with the same frequency as synchronizing signal 202. A reference numeral 2502 indicates a correlation decision circuit and a reference numeral 2504 denotes a frequency divider. An output pulse signal 2506 of the sync edge detector 2501 and an output pulse signal 2508 of the frequency divider 2503 are applied to the correlation decision circuit 2502. If the output pulse signal 2508 from the frequency divider 2503 coincides with the output pulse signal 2506 from the sync edge detector 2501, the correlation decision circuit 2502 outputs a pulse signal 2509 for resetting the frequency divider 2504, whereas if there is no output pulse signal of the sync edge detector 2501 coinciding with the output pulse signal 2508 from the frequency divider 2503, the correlation decision circuit 2502 outputs a pulse signal 2507 for resetting the frequency divider 2503 when the subsequent output pulse signal 2506 of the sync edge detector 2501 is applied to the correlation decision circuit 2502. Being reset by the output pulse signal 2509 from the correlation decision circuit 2502, the frequency divider 2504 divides the frequency of reference clock signal 2505 and generates synchronizing signal 203 which has a matching phase and the same frequency as synchronizing signal 202.

Figure 26:
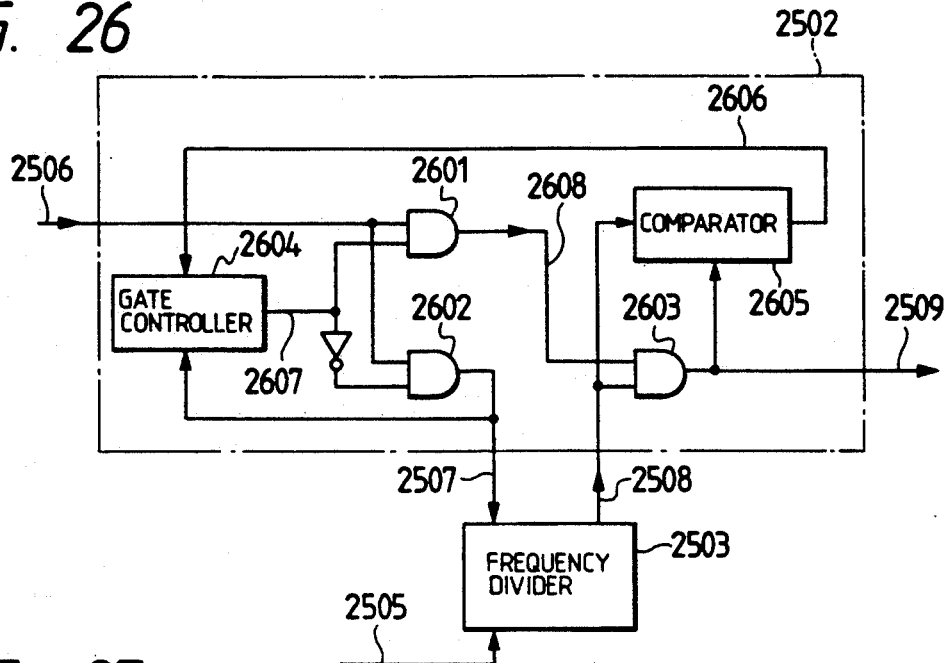
FIG. 26 is a block diagram of an example of a correlation decision circuit in the sync-generator shown in FIG. 25.
Figure 27:
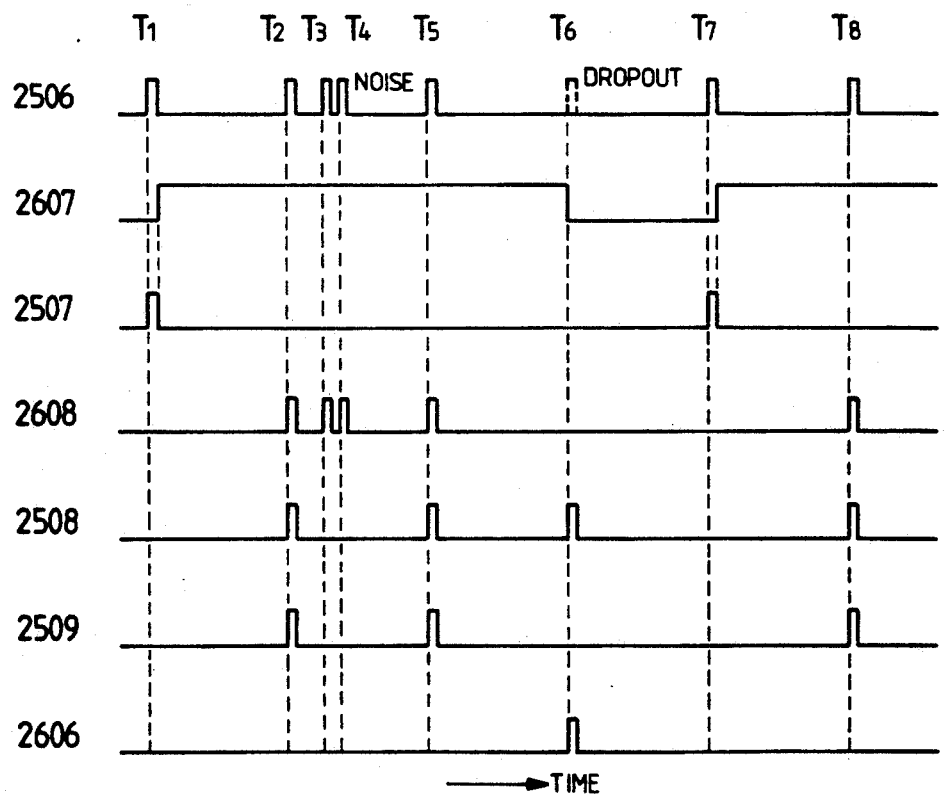
FIG. 27 is a timing chart of signal waveforms of various sections of the correlation decision circuit shown in FIG. 26.

FIG. 26 is a block diagram which indicates a configuration example of correlation decision circuit 2502, and FIG. 27 indicates the waveforms of the various sections for explaining the operation of the circuit of FIG. 26.

In FIG. 26, reference numerals 2601 through 2603 designate AND gates. A reference numeral 2604 denotes a gate controller which controls gates 2601 and 2602. It changes gate control output 2607 to the high level at the start of output signal 2507 of gate 2602, then it changes gate control output 2607 to low level to cope with the leading input of output signal 2606 of comparator 2605 which will be described later. In other words, when gate control output 2607 is at the high level, gate 2601 is open and gate 2602 is closed. When it is at the low level, gate 2601 is closed and gate 2602 is open.

If gate 2602 were open now, the output pulse signal 2506 of sync edge detector 2501 would pass through gate 2602, and its output signal 2507 would reset frequency divider 2503. In addition, output signal 2507 of gate 2602 would change gate control output 2607 to the high level with its leading edge, close gate 2602, and open gate 2601.

After resetting, frequency divider 2503 would divide reference clock 2505, and output pulse signal 2508 at the same cycle as synchronizing signal 202. Its output becomes the first input of gate 2603.

Sync edge detection pulse signals 2506 which are input thereafter pass through gate 2601, and its output signal 2608 is input to the second input of gate 2603.

Whether sync edge detection pulse 2506 was detected from normal synchronizing signals or not can be judged by the reset timing of frequency divider 2503 (i.e., by checking whether the cycle from T1 in FIG. 27 to the next input timing T2 matches the cycle of regular synchronizing signals). After resetting, frequency divider 2503 outputs pulse signal 2508 at the same cycle as synchronizing signals. At this time, if the pulse signal 2608 which is output from gate 2601 and the aforementioned pulse signal 2508 match, then the sync edge detection pulse 2506 at timing T2 is judged to have been detected from a regular synchronizing signal, and it is output from gate 2603 as sync reset signal 2509.

When the sync reset signal 2509 and the output pulse signal 2508 of frequency divider 2503 do not match, comparator 2605 outputs pulse signal 2606.

Because sync reset signal 2509 and the output pulse signal 2508 of frequency divider 2503 match at timing T2, the output signal 2606 of comparator 2605 remains at the low level, so that gate control signal 2607 is unchanging, and gate 2601 remains in the open condition.

When electrical noise is mixed in synchronizing signal 202, however, there is, naturally, the possibility that static pulse is included in the sync edge detection output pulse signal 2506. For instance, T3 and T4 in FIG. 27 are examples of this. If the signal should appear at timing T3 or T4 as the output signal 2608 of gate 2601, it would not match the output signal 2508 of frequency divider 2503 because neither the frequency nor the phase would match the regular synchronizing signal, so that output would not come from gate 2603. Therefore, there would be no change in the output signal of comparator 2605, and gate 2601 would remain open and wait for the next input from sync edge detection signal 2506.

If sync edge detection signal 2506 is input exactly one synchronizing cycle after the aforementioned timing T2 at timing T5, this will match the output pulse signal 2508 of frequency divider 2503, so that matching decision would be executed again, and sync reset signal 2509 would be output from gate 2603.

If synchronizing signal 202 is dropped because reception radiowaves are cut off or extreme changes in video amplitude exist, there will, of course, not be any input of sync edge detection signal 2506. In FIG. 27, T6 is exactly one synchronizing cycle after T5. Frequency divider 2503 outputs pulse signal 2508 at timing T6, however, because sync edge detection signal 2506 is dropped, pulse signal 2608 is not input to gate 2603. Therefore, output signal 2509 of gate 2603 is not output. Comparator 2605 outputs mismatch signal 2606, and this causes gate control signal 2607 to change to low level, so that gate 2601 closes and gate 2602 opens.

The sync edge detection signal 2506 input at the T7 timing passes through gate 2602, and resets frequency divider 2503. Then, gate control signal 2607 is changed to the high level, and gate 2602 is closed and gate 2601 is opened. After this, correlation is judged per synchronizing cycle.

Sync reset signal 2509, which is attained in the manner described above, removes noise from synchronizing signal 202, and is a signal which is a correlated with the regular synchronizng signal. Therefore, the frequency divider 2504 which is reset by the sync reset signal 2509 is never reset by noise, and the synchronizing signal 203 which is generated is a stable signal which matches the frequency and phase of input synchronizing signal 202.

Figure 28:
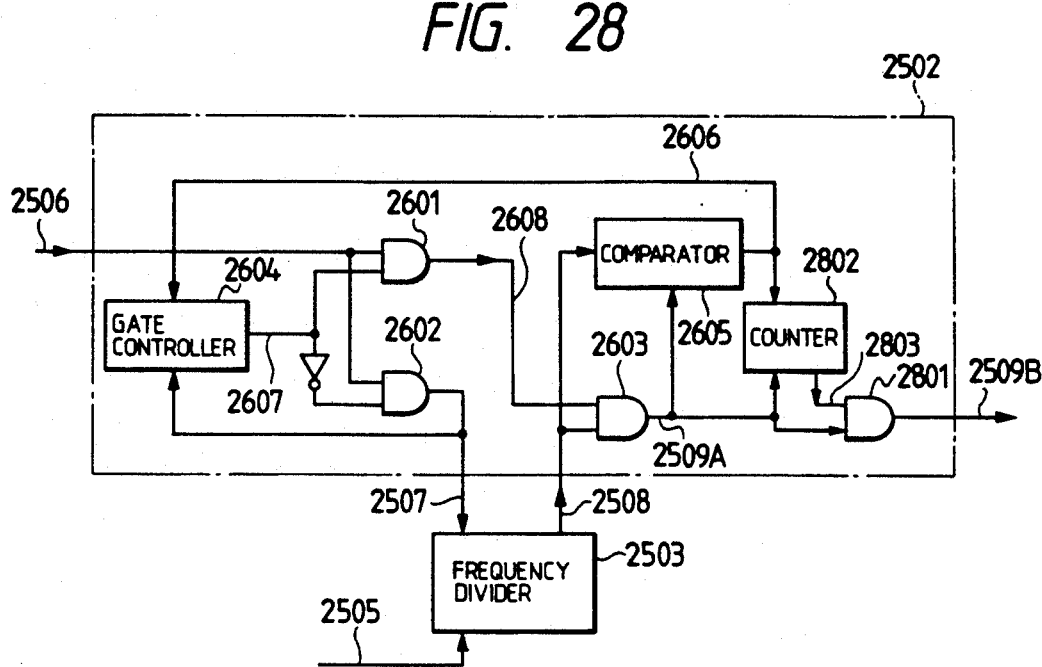
FIG. 28 is a block diagram of another example of a correlation decision circuit in the sync-generator shown in FIG. 25.
Figure 29:
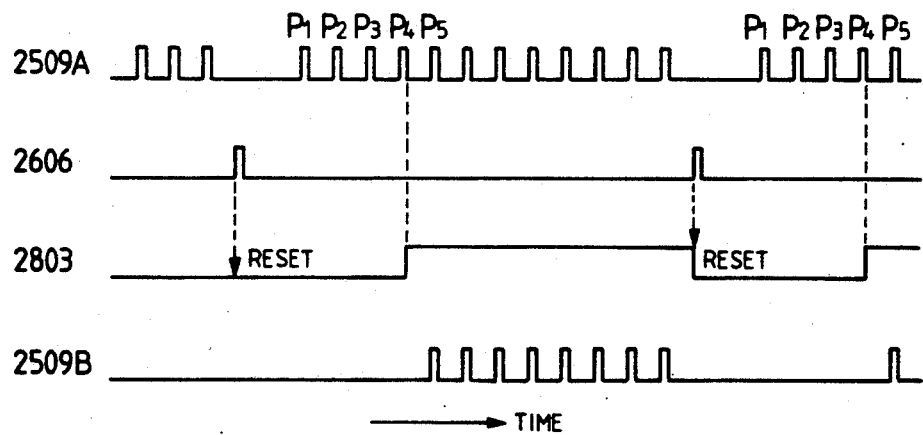
FIG. 29 is a timing chart of signal waveforms of various sections of the correlation decision circuit shown in FIG. 28.

FIG. 28 shows another configuration example of the correlation decision circuit 2502, partly as a block diagram and partly as an abbreviated diagram, and FIG. 29 indicates the waveforms of the various sections which are used for explaining the operation of the circuit of FIG. 28.

Configuration elements which are common with FIG. 27 are abbreviated from the description below.

In FIG. 28, a reference numeral 2801 denotes an AND gate, and 2802 denotes a counter which outputs the signal 2803 which opens the gate 2801 after counting the output pulse signal 2509A of gate 2603 and the set value is exceeded.

The operation in which the pulse signal is output from gate 2503 is the same as that described in FIG. 26 and FIG. 27.

The counter 2802 is reset by the mismatch decision output pulse signal 2606 of comparator 2605. After resetting, counter 2802 starts counting output pulse signal 2509 of gate 2603 which is to be input, and when the count value exceeds the value set, then the output 2803 is held at a high level. While counter circuit output 2803 is held at a high value, gate 2801 outputs sync reset signal 2509B.

In FIG. 29, the output setting of counter 2802 is set to 4. After resetting, when four output pulse signals 2509A are input to gate 2603, the output 2803 is changed to the high level, then from the fifth sync reset signal 2509A of gate 2603, gate 2801 is output as sync reset signal 2509B. Of the inputs to counter 2802 which are less than the setting value, if any of them receive mismatch decision output 2606, counter circuit 2802 will be reset and gate 2801 will remain closed, so that sync reset signal 2509B is not output.

Therefore, if gate 2603 and comparator 2605 have continuous correlations which exceed the value set by the counter 2802, then sync reset signal 2509B will be output from gate 2801. In case there is no correlation at a value less than the setting of the counter 2802, sync reset signal 509B will not be output. For instance, if multiple noise which is included in input synchronizing signal 202 are considered the same cycle as the synchronizing signal and the signal detected from their input edge is output from gate 2603, the sync reset signal will not be output from gate 2801 if their correlation is a value less than that set by counter 2802, so that frequency divider 2504 will not be mistakenly reset by time noise.

In the descriptions above, the setting value of continuous correlations in counter 2802 have been described as a fixed value, however, it is not necessarily fixed, and there is a method to make the setting value variable according to the reception conditions. Although this is not shown in the diagrams, the counter 2802 is made up of components which allow switching between multiple settings, and the switching is executed by variable correlation control methods which are not shown.

As one method of variable correlation control, the strength of the received field is detected by the AGC voltage change of the receiver, and a control signal to switch the setting value according to the size of the AGC voltage is generated. For instance, in a strong field, if the synchronizing signal is stable and the number of correlations is set to a high value, then the possibility of attaining a correlation is high. In a weak field, however, there is little chance of long periods without continuous correlations because of dropping synchronizing signals, so that if the number of correlations is set to too high a value, it is possible that the phases of the synchronizing signals of the sync-generator will not match. Therefore, in strong fields, control signals should be generated, so that the setting changes are set for long continuous correlation, and in weak fields, they should be generated, so that the setting changes are set for short continuous correlation.

Another method of variable correlation control is a method in which the value of continuous correlation is varied in response to the selecting of channel to be received.

In general, the phases of synchronizing signals of different broadcasting stations are not the same. When the receiving channel is switched, correlation between phases cannot be maintained with the synchronizing signal before switching, so that the sync reset signal is not output. When the synchronizing signal after switching is input, correlation decision at a new timing is started, and a new sync reset signal is output when a continuous correlation number set by counter 2802 is exceeded. Therefore, during the period after the receiving channel is switched until a new sync reset signal is output, synchronizing signals are generated at the timing used before the receiving channel was switched, so that the longer the setting value of the continuous correlation of counter 2802, the longer synchronization difference. Thus, immediately after the receiving channel is switched, the setting value of continuous correlation of counter 2802 is changed to a short value by receiving channel switching information from the station selection circuit (which is not shown). Then, if the time setting value is returned to a long value by the sync reset signal after the correlation decision, the synchronizing difference time after receiving channel switching can be shortened.

Figure 30:
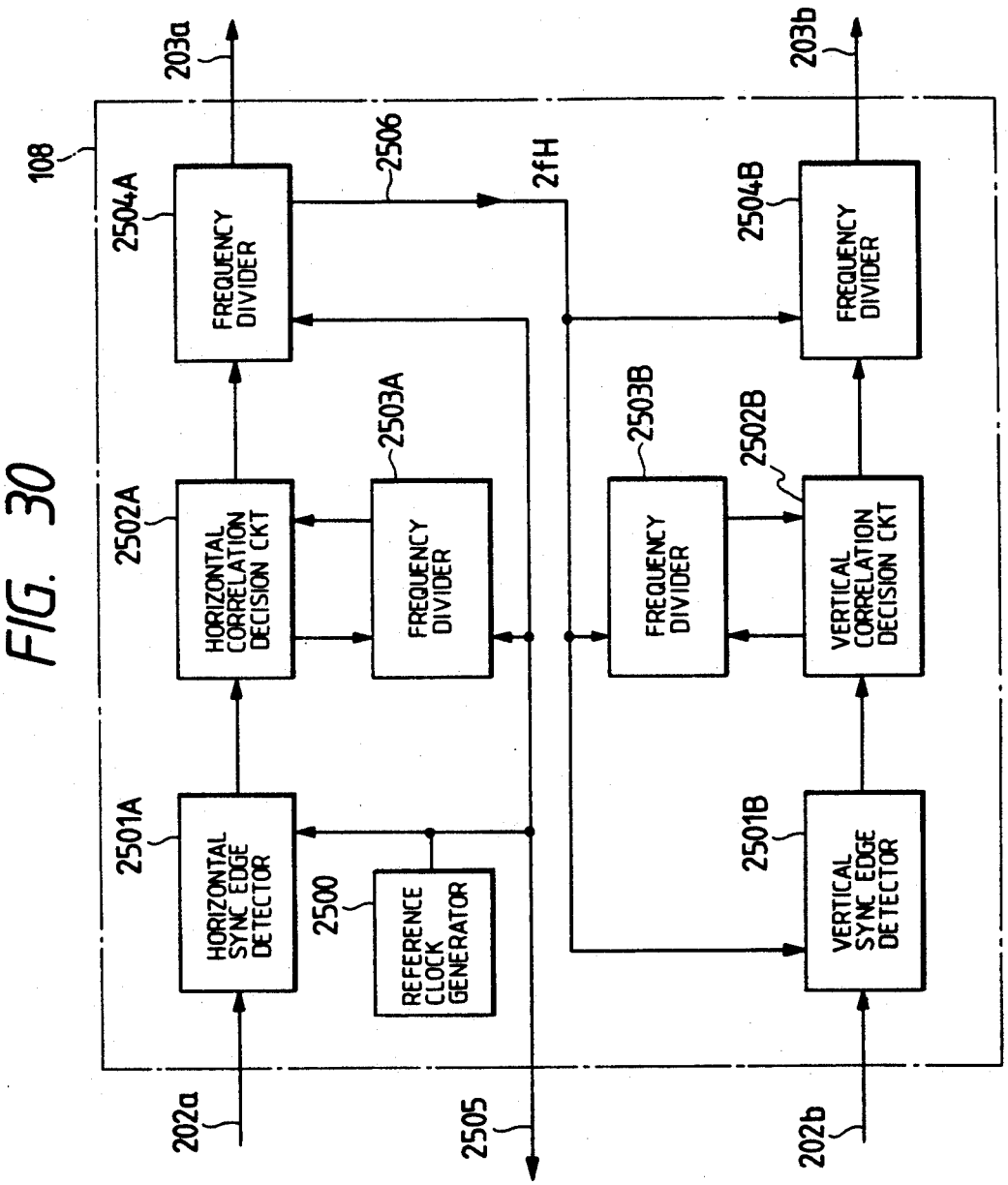
FIG. 30 is a block diagram of horizontal and vertical sync-generator using the sync-generator shown in FIG. 25.

FIG. 30 shows a block diagram of an example of horizontal and vertical sync-generator to which the sync-generator of FIG. 25 is applied.

In FIG. 30, a reference symbol 2501A designates a horizontal sync edge detector which detects the pulse signal which is synchronized with the reference clock signal 2505 at each input edge of the input horizontal synchronizing signal 202a. If, for example, reference clock signal 2505 was set at a high frequency of 14318 kHz, and frequency divider 2503A divided it into 910 parts, a repeated frequency which is the same as the horizontal synchronizing signal would be attained. An output signal of the horizontal sync edge detector 2501A and an output signal of the frequency divider 2503A are applied to a horizontal correlation decision circuit 2502A. If the output pulse signal from the frequency divider 2503A coincides with the output pulse signal from the horizontal sync edge detector 2501A, the horizontal correlation decision circuit 2502A outputs a horizontal sync reset signal to be applied to a frequency divider 2504A, whereas if the output pulse signal from the frequency divider 2503A does not coincide with the output pulse signal from the horizontal sync edge detector 2501A, the horizontal correlation decision circuit 2502A outputs a signal for resetting the frequency divider 2503A when the subsequent output pulse signal from the horizontal sync edge detector 2501A is applied to the horizontal correlation decision circuit 2502A. The frequency divider 2504A is reset by the horizontal sync reset signal, and a stable horizontal synchronizing signal 203a is generated by dividing the 14318 kHz reference clock signal 2505 into 910 parts. In the frequency divider 2504A, after 455 divisions, one-half division is carried out to make up the 1/910 frequency divider. The 1/455 division output 2506 of frequency divider 2504A is twice the frequency (2 fH) of the repeat frequency of the horizontal synchronizing signal. A reference symbol 2501B designates a vertical sync edge detector and it detects the pulse signal which synchronizes with the 2 fH clock signal 2506 at each input edge of input vertical synchronizing signal 202b. Frequency divider 2503B attains the same repeat frequency 60 Hz as the vertical synchronizing signal by dividing the 2 fH clock signal 2506 by 525.

Both output signals of the frequency divider 2503B and the vertical sync edge detector 2501B are applied to a vertical correlation decision circuit 2502B. If the output pulse signal from the frequency divider 2503B coincides with the output pulse signal from the vertical sync edge detector 2501B, the vertical correlation decision circuit 2502B outputs a vertical sync reset signal to be applied to a frequency divider 2504B, whereas if the output pulse signal from the frequency divider 2503B does not coincide with the output pulse signal from the vertical edge detector 2501B, the vertical correlation decision circuit 2502B outputs a signal for resetting the frequency divider 2503B when the subsequent output pulse signal of the vertical edge detector 2501B is applied to the vertical correlating decision circuit 2502B.

The frequency divider 2504B is reset by the vertical sync reset signal, and a stable vertical synchronizing signal 203b is generated by dividing the 2 fH clock signal 2506 which is two times the frequency of the horizontal synchronizing frequency by 525.

Figure 31:
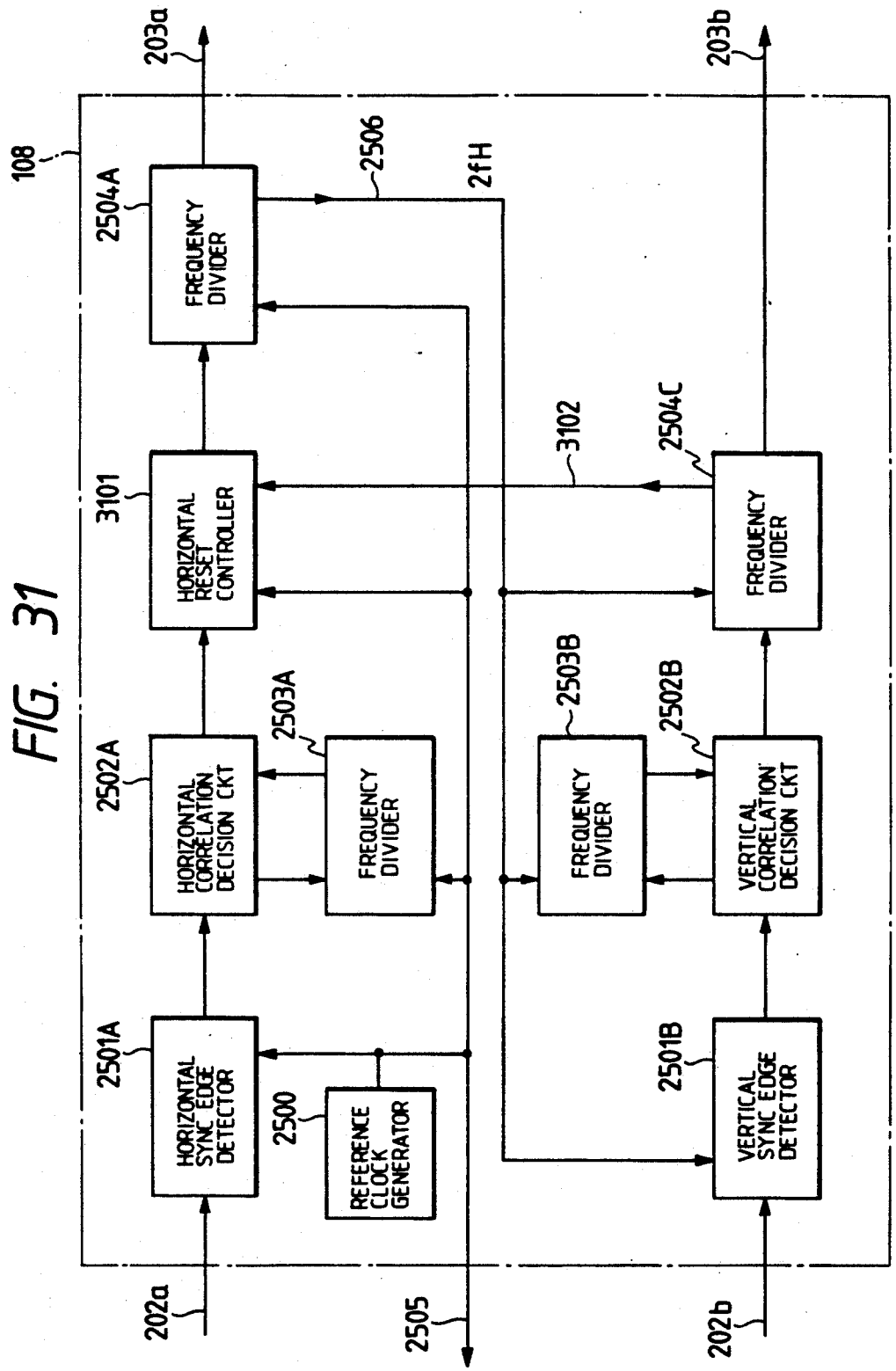
FIG. 31 is a block diagram of another example of horizontal and vertical sync-generator using the sync-generator shown in FIG. 25.

FIG. 31 is a block diagram which shows another example of horizontal synchronizing and vertical synchronizing generator. Descriptions of components which overlap with those in FIG. 30 are abbreviated. A reference numeral 3101 designates a horizontal reset controller which controls resetting of frequency divider 2504A in the manner that the resetting is executed only at an arbitrary line in the field. The frequency divider 2504C is reset by the output signal of vertical correlation decision circuit 2502B, and generates the stable vertical synchronizing signal 203b by dividing the 2 fH clock signal 2506, which is two times the horizontal synchronizing frequency, into 525 parts. Furthermore, the divider 2504C outputs a control signal 3102 of horizontal reset controller 3101.

Figure 32:
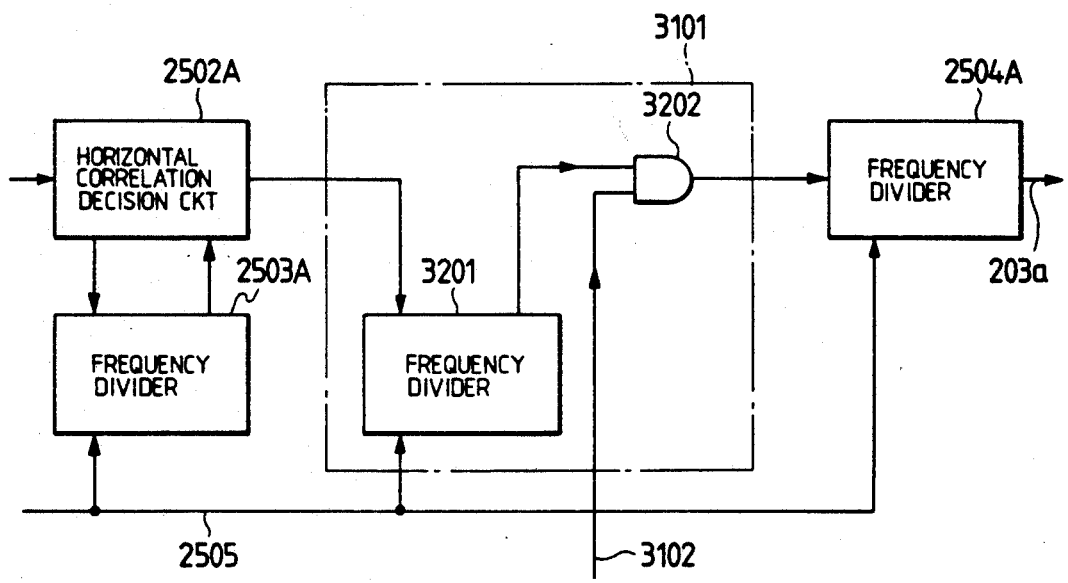
FIG. 32 is a block diagram of a horizontal reset control circuit in the horizontal and vertical sync-generator shown in FIG. 31.

FIG. 32 is a block diagram which shows an example of the horizontal reset controller 3101 in FIG. 31. The output signal of horizontal correlation decision circuit 2502A resets a frequency divider 3201. Each time the frequency divider 3201 divides the 14318 kHz reference clock signal 2505 910 times (i.e., each horizontal cycle), it outputs a pulse signal in the same phase of the reset signal and adds it to the first input terminal of gate 3202. When the control signal 3102 which is added to the second input terminal of gate 3202 is at the high level, the output pulse signal of frequency divider 3201 is output from gate 3202, and frequency the divider 2504A is reset. When the control signal 3102 is at the low level, however, the gate 3202 is closed, so that the reset signal is not added to the frequency divider 2504A. Therefore, if, for example, the control signal 3102 is at the high level only during the vertical blanking period, then frequency divider 2504A will only be reset during this period, so that horizontal synchronizing reset points will not appear on the screen.

Figure 33A:
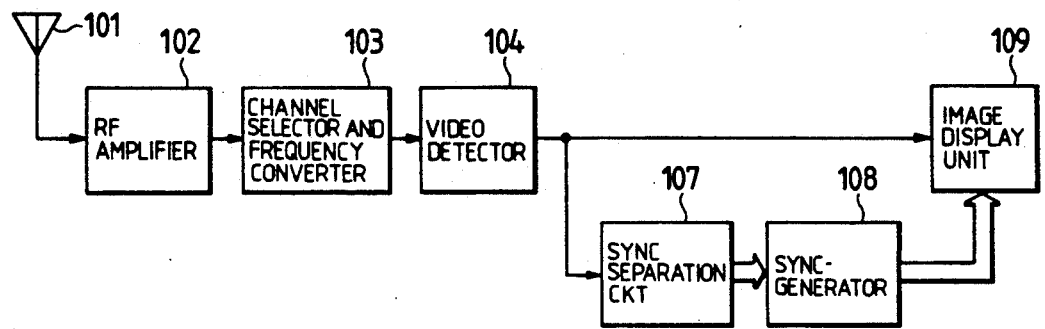
FIGS. 33(a), 33(b), 34, 35 and 36 are block diagrams of television receivers according to other embodiments of the present invention.

FIG. 33(a) is a block diagram of a television receiver according to another embodiment of the present invention. The components which are the same as in FIG. 1 will be abbreviated from the description which follows. The difference with FIG. 1 is that there is no variable delay circuit 105 and time difference detector 106. The sync-generator 108 is of the same configuration as shown in FIG. 31 and the description will be abbreviated, however, resetting of horizontal synchronization will only be executed during the vertical blanking period.

In this embodiment, the sync-generator 108 generates a stable synchronizing signal which synchronizes with the output synchronizing signal of sync separation circuit 107. This synchronizing signal drives the synchronizing system of the image display unit 109, so that, for example, even if fading causes drastic fluctuations in the amplitude of synchronizing signals in the video signals, or if a weak field causes a synchronizing signal which has been affected by noise to be output from sync separation circuit, the synchronization of the image display unit 109 will not be in error. Furthermore, during periods other than vertical blanking periods, the timing of the output horizontal synchronizing signal of sync-generator 108 will not change, so that horizontal synchronizing distortion will not occur in a picture displayed on the screen and a clear image reception can be supplied.

Figure 33B:
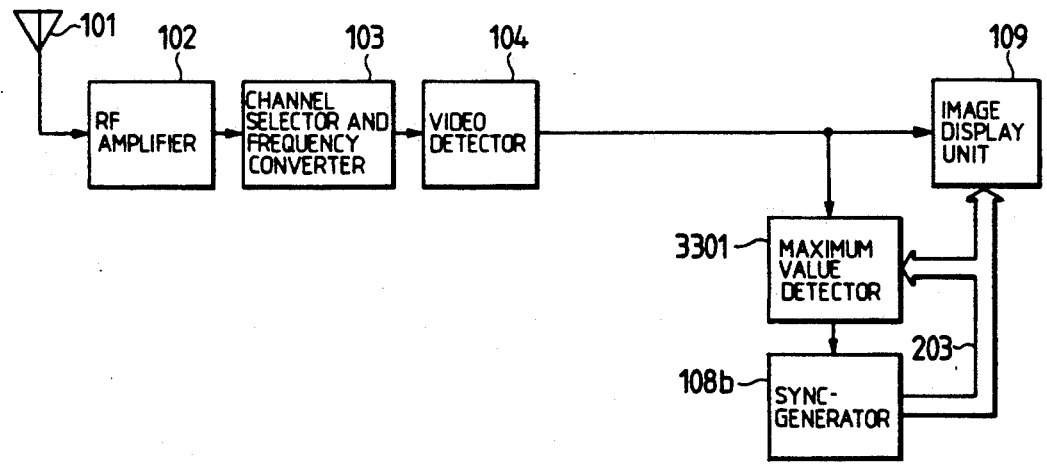

FIG. 33(b) is a block diagram of a television receiver according to another embodiment of the present invention. The description of elements which are the same as FIG. 33(a) will be abbreviated. When one synchronizing signal cycle of video signal 201 which is output from video detector 104 contains a plurality of synchronizing signals, a maximum value detector 3301 detects the synchronizing signal with the maximum amplitude, and it inputs the synchronizing signal with the maximum amplitude to a sync-generator 108b. The sync-generator 108b generates the stable synchronizing signal 203 which synchronizes with the aforementioned synchronizing signal with the maximum amplitude, and it supplies the synchronizing signal 203 to the image display unit 109.

Figure 42:
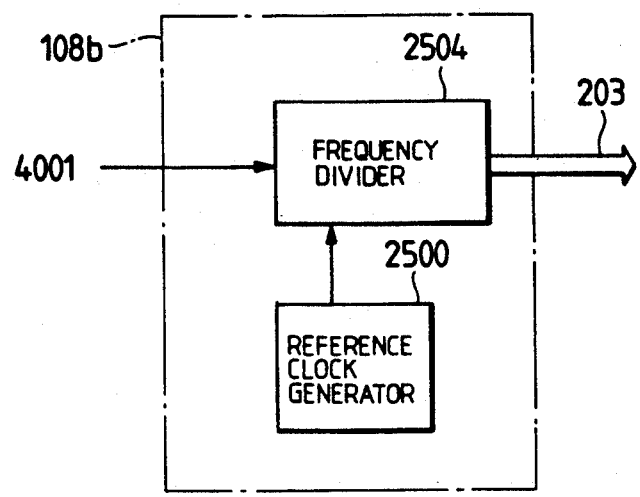
FIG. 42 is a block diagram of a sync-generator in the television receiver shown in FIG. 33(b)

In this case, the sync-generator 108b does not have to determine the correlation of the output signal of the maximum value detector 3301, so that the synchronizing edge detector 2501, correlation decision circuit 2502 and frequency divider 2503 in FIG. 25 can be deleted to make up FIG. 42. In FIG. 42, a reference numeral 4001 is the output signal of maximum value detector 3301. The functions are the same as FIG. 25.

The frequency divider 2504 uses the output signal 4001 of maximum value detector 3301 as a reset signal to divide the clock signal output of reference clock generator 2500, so that the synchronizing signal 203 which synchronizes with the output signal 4001 of the maximum value detector is attained. This example has the effect of stabilizing the synchronization on television screen even when ghosts cause a plurality of synchronizing signals to be included in one cycle of the synchronizing signal of the video signal, and it reduces the phenomenon in which DU ratio inversion causes the main signal on the television screen to move.

Figure 34:
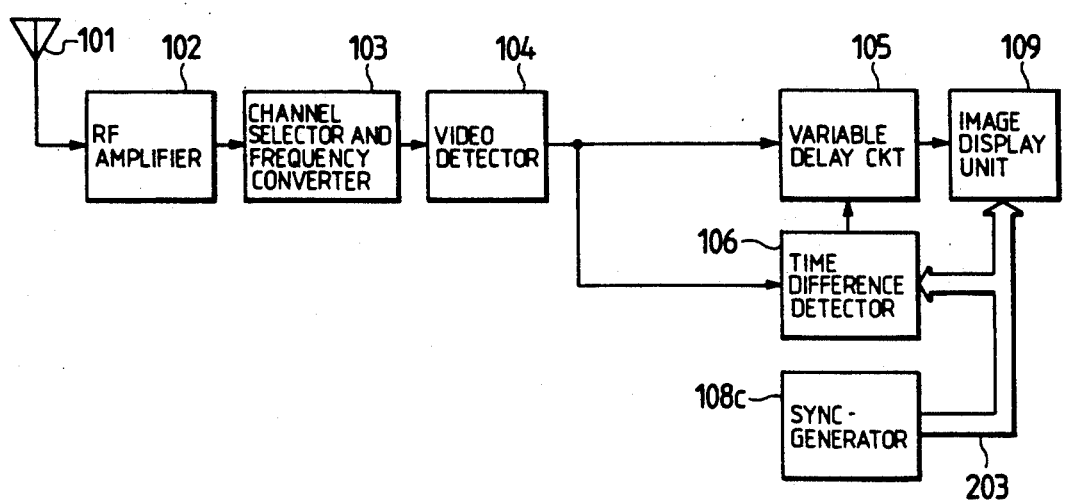
Figure 43:
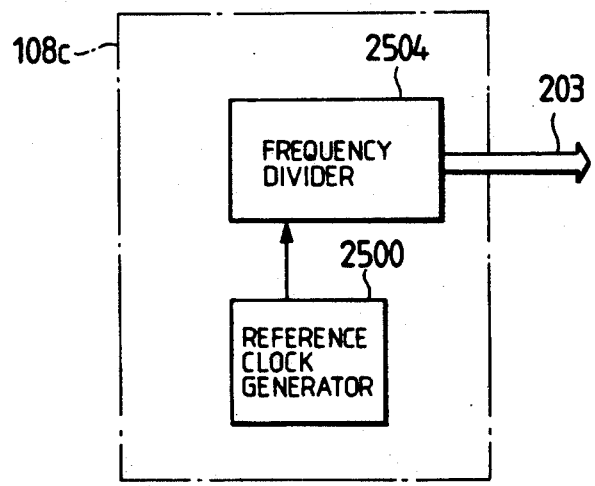
FIG. 43 is a block diagram of a sync-generator in the television receiver shown in FIG. 34.

FIG. 34 shows a television receiver according to another embodiment of the present invention. In this diagram, the symbols which are the same as those in FIG. 1 have the same functions. The difference between this embodiment and that in FIG. 1 is that by removing the sync separator 107 in FIG. 1, a sync-generator 108c outputs the reference synchronizing signal 203 at a timing which is totally independent of the synchronizing signal timing included in the output video signal of video detector 104. Therefore, the configuration of the sync-generator 108c deletes the sync edge detector 2501, correlation decision circuit 2502 and frequency divider 2503 from FIG. 25 to create FIG. 43. In FIG. 43, the symbols which are the same as those in FIG. 25 have the same functions.

In this embodiment, the time difference detector 106 detects the time difference between the reference synchronizing signal output from sync-generator 108c and the synchronizing signal with the maximum amplitude in the video signal within one synchronizing cycle in the same manner as that described in FIG. 1. Because the timing of the synchronizing signal with the maximum level included in the video signal and the reference synchronizing signal of sync-generator 108c are matched and output to image display unit 109 by controlling the delay with the variable delay circuit according to the time difference, distortions in synchronization in the television image are eliminated and image skipping on the television screen is reduced, even when ghosts cause a plurality of synchronizing signals to be included in the video signal.

Figure 35:
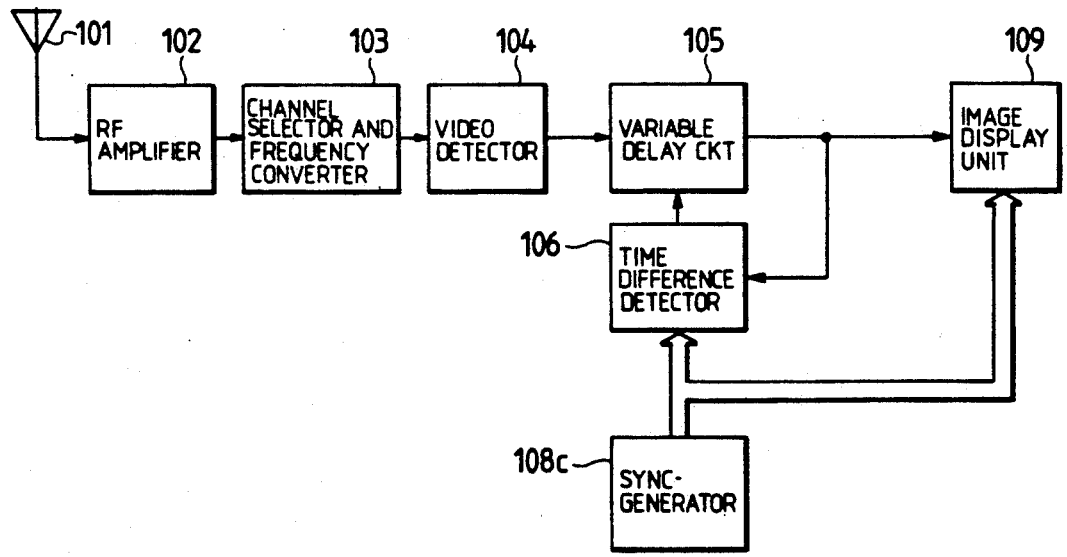

FIG. 35 shows a television receiver according to another embodiment of the present invention. In this diagram, the symbols which are the same as those in FIG. 1 have the same functions.

Although the circuit operation in the embodiment of FIG. 35 is similar to that in FIG. 34, the difference is that FIG. 34 uses feed-forward delay correction as opposed to the feedback method used in FIG. 35; i.e., in FIG. 35, the video signal for which the time difference with the reference synchronizing signal output from sync-generator 108c is to be detected is delayed by variable delay circuit 105 before the time difference is detected. As in the embodiment of FIG. 1, the embodiment of FIG. 35 has the effect of reducing distortions caused by ghosts and movement of images.

Figure 36:
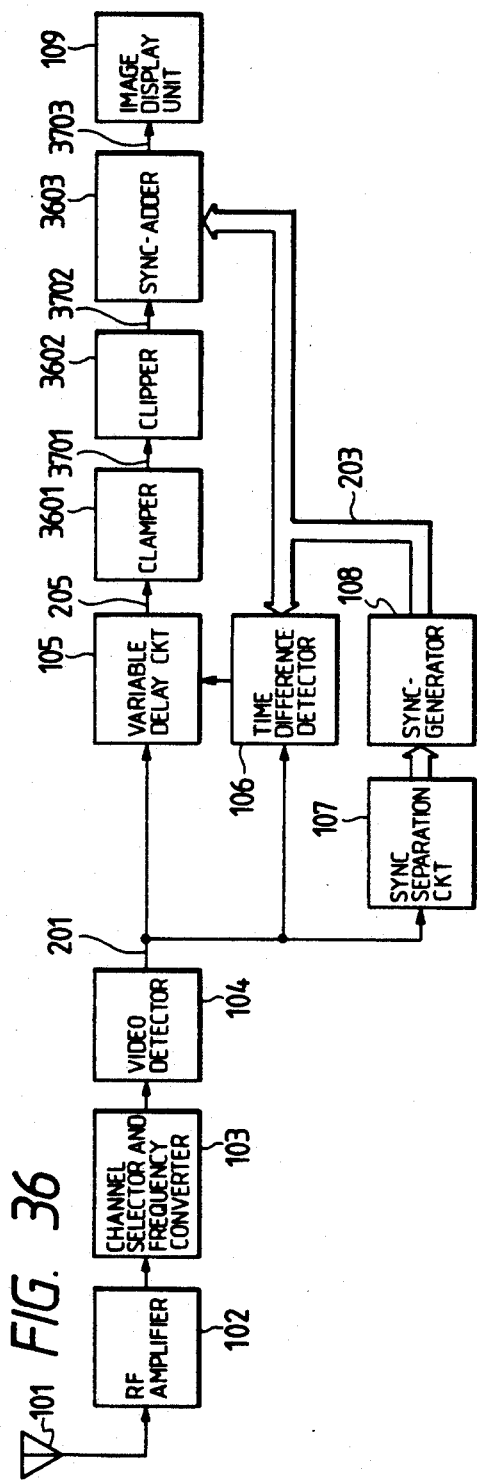
Figure 37:
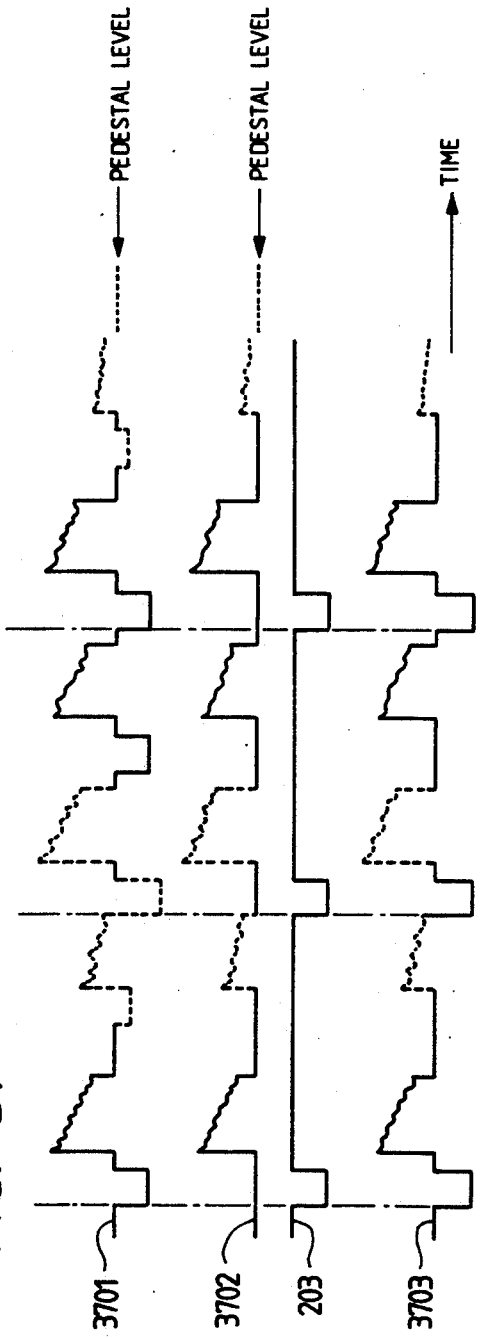
FIG. 37 is a timing chart of signal waveforms of various sections of the television receiver shown in FIG. 36.

FIG. 36 shows a block diagram of a television receiver according to another embodiment of the present invention. The sections with the same symbols as in FIG. 1 are abbreviated from the description which follows. FIG. 37 shows signal waveforms of various sections for explaining the operation of the embodiment shown in FIG. 36.

A reference numeral 3601 denotes a clamper which aligns the pedestal level of video signals to a constant value, 3602 denotes a clipping circuit which clips the intensity signals which are less than or equal to the pedestal level of the video signal 3701 which has been pedestal clamped by the aforementioned pedestal clamper 3601, and 3603 denotes a sync-adder which adds the reference synchronizing signal 203 generated by sync-generator 108 to the video signal 3702 (which had its intensity signals less than or equal to the pedestal level clipped at the aforementioned clipping circuit 3602). The video signal 3703 which was combined at the sync-adder 3603 is supplied to the image display unit 109.

In this embodiment, even when ghosts cause a plurality of synchronizing signals to be included in one cycle of the video signal, all these synchronizing signals are removed, then a single stable synchronizing signal is added to one cycle of the synchronizing signal and supplied to the image display unit. This makes it possible to reduce distortion of synchronization and image movement in the same manner as in FIG. 1 without independently inputting the video signal and synchronizing signal to the image display unit.

FIG. 38 shows a block diagram of a television receiver according to another embodiment of the present invention. The elements which are the same as in FIG. 3 are abbreviated from the description which follows. Also, the elements 3601 through 3603 are the same as those described in FIG. 36. This embodiment makes it possible to reduce distortion of synchronization and image movement in the same manner as in FIG. 1 without independently inputting the video signal and synchronizing signal to the image display unit as in FIG. 3.

FIG. 39 is a block diagram of a television receiver according to another embodiment of the present invention. The elements which are the same as in FIG. 33(b) are abbreviated in the description which follows. Also, the elements 3601 through 3603 are the same as those described in FIG. 36. This example makes it possible to reduce distortion of synchronization and image movement in the same manner as in FIG. 1 without independently inputting the video signal and synchronizing signal to the image display unit as in FIG. 33(a) and FIG. 33(b).

FIG. 40 shows a block diagram of a television receiver according to another embodiment of the present invention. The elements which are the same as in FIG. 34 are abbreviated in the description which follows. Also, the elements 3601 through 3603 are the same as those described in FIG. 36. This embodiment makes it possible to reduce distortion of synchronization and image movement in the same manner as in FIG. 1 without independently inputting the video signal and synchronizing signal to the image display unit as in FIG. 34.

FIG. 41 shows a block diagram of a television receiver according to another embodiment of the present invention. The elements which are the same as in FIG. 35 are abbreviated in the description which follows. Also, the elements 3601 through 3603 are the same as those described in FIG. 36. This embodiment makes it possible to reduce distortion of synchronization and image movement in the same manner as in FIG. 1 without independently inputting the video signal and synchronizing signal to the image display unit as in FIG. 35.

Figure 44:
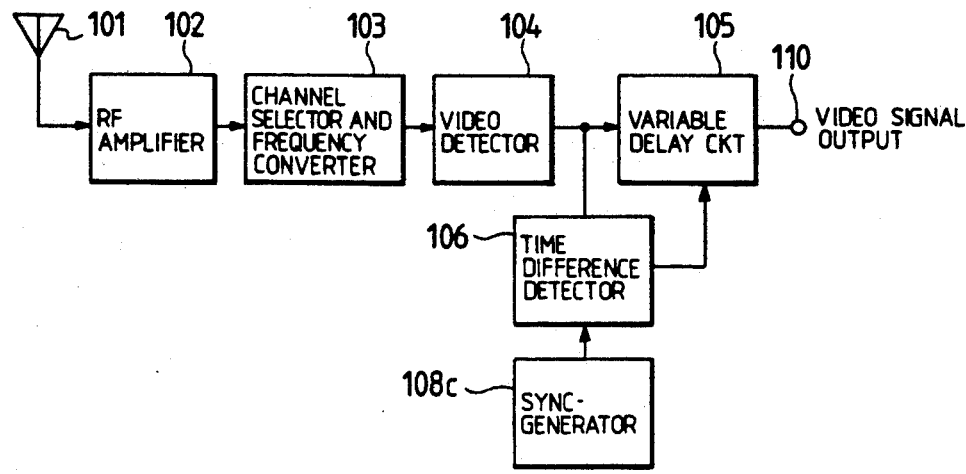
FIGS. 44 and 45 are block diagrams of television receivers according to the other embodiment of the present invention.

FIG. 44 shows a block diagram of a television receiver according to another embodiment of the present invention. In FIG. 44, 110 designates a video signal output terminal. Also, the elements which are the same as in FIG. 34 are abbreviated in the description which follows. The embodiment in FIG. 44 differs from that in FIG. 34 in that only the video signal is output from the video signal output terminal 110 to an external display, and the reference synchronizing signal of sync-generator 108c is not output. This embodiment makes it possible to reduce distortion of synchronization and image movement in the same manner as in FIG. 1 without independently inputting the video signal and synchronizing signal to the image display unit as in FIG. 34.

Figure 45:
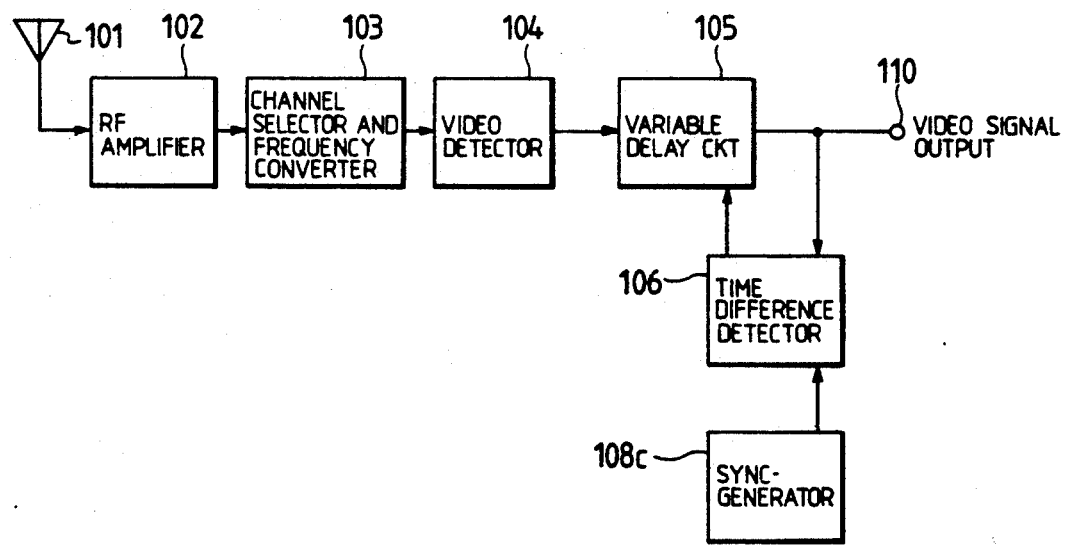

FIG. 45 shows a block diagram of a television receiver according to another embodiment of the present invention. In FIG. 45, the elements which are the same as in FIG. 44 are abbreviated in the description which follows. The example in FIG. 45 differs from that in FIG. 44 in that it uses a feedback type delay correction as opposed to the feed-forward delay correction in FIG. 44. This embodiment makes it possible to reduce distortion of synchronization and image movement in the same manner as in FIG. 1 without independently inputting the video signal and synchronizing signal to the image display unit as in FIG. 44.

We claim:

1. A television receiver for receiving a television signal by detecting a reception signal which has been converted to a video intermediate frequency signal by passing it through an RF amplifier and a channel selection and frequency converter with a video detector, comprising:
   a sync separator for separating a synchronizing signal in the television signal; and
   a sync-generator for generating a synchronizing signal being synchronized with the synchronizing signal output by said sync separator;
   said sync-generator including a reference clock generator for generating a reference clock having a frequency which is N times the frequency of the synchronizing signal, a sync edge detector for detecting, at the time of the reference clock, an input edge of each signal output by said sync-generator first and second frequency dividers each of which divides the frequency of the reference clock by N, and a correlation decision circuit, which receives output signals from said first frequency divider and said sync edge detector, for outputting, if the output signal of said first frequency divider coincides with the output signal of said sync edge detector, a signal for resetting said second frequency divider, and outputting, if the output signal of said first frequency divider does not coincide with the output signal of said sync edge detector, a signal for resetting said first frequency divider when a subsequent output signal from said sync edge detection is applied thereto.

2. A television receiver in claim 1, wherein said correlation decision circuit comprises:
   a first AND gate which inputs the output signal of said sync edge detector on one side;
   a second AND gate which inputs the output signal of said sync edge detector on one side, and outputs a signal which resets said first frequency divider;
   a gate controller which controls the AND gates so that when the first AND gate is open the second AND gate will be closed, and when the first AND gate is closed and the second AND gate will be opened;
   a third AND gate which inputs the output signal of said first frequency divider to one side, and inputs the output from said first AND gate to the other side; and
   a comparator which compares the output signal of the said third AND gate and the output signal of said first frequency divider, wherein if a mismatch is detected said comparator outputs a signal to said gate controller instructing it to close said first AND gate.

3. A television receiver in claim 1, wherein said correlation decision circuit comprises:
   a first AND gate which inputs the output signal of said sync edge detector on one side;
   a second AND gate which inputs the output signal of the aforementioned sync edge detector on one side, and outputs a signal which resets said first frequency divider;
   a gate controller which controls the AND gates so that when the first AND gate is open the second AND gate will be closed, and when the first AND gate is closed the second AND gate will be opened;
   a third AND gate which inputs the output signal of said first frequency divider to one side, and inputs the output from said first AND gate to the other side;
   a comparator which compares the output signal of the said third AND gate and the output signal of said first frequency divider, wherein if a mismatch is detected said comparator outputs a signal to said gate controller instructing it to close said gate first AND gate;
   a counter which is reset by the mismatch signal of the said comparator, and counts output signals of said third AND gate; and
   a fourth AND gate which inputs the output signal of the said counter to one side after it has counted to a fixed value, and inputs the output signal of said third AND gate to the other side.

4. A television receiver in claim 3, wherein said correlation decision circuit varies the count value for outputting the signal from said counter to open said fourth AND gate according to the size of a receiver AGC voltage.

5. A television receiver in claim 3, wherein said correlation decision circuit varies the count value for outputting the signal from said counter to open said fourth AND gate according to switching information of the receiving channel.

6. A horizontal sync-generator comprising:
   a reference clock generator for generating a reference clock having a frequency N times the frequency of the horizontal synchronizing signal;
   a horizontal sync edge detector for detecting, at the timing of the reference clock, an input edge of each horizontal synchronizing separation output signal output by a sync separator;
   first and second frequency dividers each of which divides the frequency of the reference clock by N;
   a horizontal correlation decision circuit, which receives output signals of said first frequency divider and said horizontal sync edge generator, for outputting, if the output signal of said first frequency divider coincides with the output signal of said horizontal sync edge detector, a signal for resetting said second frequency divider, and outputting, if the output signal of said first frequency divider does not coincide with the output signal of said horizontal sync edge detector, a signal for resetting said first frequency divider when a subsequent output signal of said horizontal sync edge detector is applied thereto; and
   a horizontal reset controller which allows resetting of said second frequency divider only during the vertical blanking period.

7. A horizontal sync-generator comprising:
   a reference clock generator for generating a reference clock having a frequency N times the frequency of the horizontal synchronizing signal;
   a horizontal sync edge detector for detecting, at the timing of the reference clock, an input edge of each horizontal synchronizing separation output signal output by a sync separator;
   first and second frequency dividers each of which divides the frequency of the reference clock by N;
   a horizontal correlation decision circuit which receives output signals of said first frequency divider and said horizontal sync edge generator, for outputting, if the output signal of said first frequency divider coincides with the output signal of said horizontal sync edge detector, a signal for resetting said second frequency divider, and outputting, if the output signal of said first frequency divider does not coincide with the output signal of said horizontal sync edge detector, a signal for resetting said first frequency divider when a subsequent output signal of said horizontal sync edge detector is applied thereto;

a vertical sync edge detector for detecting, at the timing of an output signal of said second frequency divider, an input edge of each vertical synchronizing separation output signal output by said sync separator;

third and fourth frequency dividers each of which divides a frequency of the output signal of said second frequency divider to the frequency of the vertical synchronizing signal; and a vertical correlation decision circuit which receives output signals of third frequency divider and said vertical sync edge detector, for outputting, if the output signal of said third frequency divider coincides with the output signal of said vertical sync edge detector, a signal for resetting said fourth frequency divider, and outputting, if the output signal of said third frequency divider does not coincide with the output signal of said vertical sync edge detector, a signal for resetting said third frequency divider when a subsequent output signal of said vertical sync edge detector is applied thereto;

wherein the horizontal synchronizing signal is output by said second frequency divider, and the vertical synchronizing signal is output by said fourth frequency divider.

8. A horizontal sync-generator comprising:

a reference clock generator for generating a reference clock having a frequency N times the frequency of the horizontal synchronizing signal;

a horizontal sync edge detector for detecting, at the timing of the reference clock, an input edge for each horizontal synchronizing separation output signal output by a sync separator;

first and second frequency dividers each of which divides the frequency of the reference clock by N;

a horizontal correlation decision circuit which received output signals of said first frequency divider and said horizontal sync edge generator, for outputting, if the output signal of said first frequency divider coincides with the output signal of said horizontal sync edge detector, a signal for resetting said second frequency divider, and outputting, if the output signal of said first frequency divider does not coincide with the output signal of said horizontal sync edge detector, a signal for resetting said first frequency divider when a subsequent output signal of said horizontal sync edge detector is applied thereto;

a horizontal reset controller which allows resetting of said second frequency divider only during the vertical blanking period;

vertical sync edge detector for detecting, at the timing of an output signal of said second frequency divider, an input edge of each vertical synchronizing separation output signal output by a sync separator;

third and fourth frequency dividers each of which divides a frequency of the output signal of said second frequency divider to the frequency of the vertical synchronizing a signal; and a vertical correlation decision circuit which receives output signals of said third frequency divider and said vertical sync edge detector, for outputting, if the output signal of said third frequency divider coincides with the output signal of said vertical sync edge detector, a signal for resetting said fourth frequency divider, and outputting, if the output signal of said third frequency divider does not coincide with the output signal of said vertical sync edge detector, a signal for resetting said third frequency divider when a subsequent output signal of said vertical sync edge detector is applied thereto;

wherein the horizontal synchronizing signal is output by said second frequency divider, and the vertical synchronizing signal is output by said fourth frequency divider.

* * * * *